(12) United States Patent  
Yokoyama et al.

(10) Patent No.: US 12,374,294 B2  
(45) Date of Patent: Jul. 29, 2025

(54) DISPLAY DEVICE, ELECTRONIC DEVICE, AND DISPLAY CONTROL METHOD

(71) Applicant: Sony Semiconductor Solutions Corporation, Kanagawa (JP)

(72) Inventors: Kazuki Yokoyama, Kanagawa (JP); Takashi Toyoda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/574,538

(22) PCT Filed: Jun. 13, 2022

(86) PCT No.: PCT/JP2022/023627  
§ 371 (c)(1),  
(2) Date: Dec. 27, 2023

(87) PCT Pub. No.: WO2023/013247  
PCT Pub. Date: Feb. 9, 2023

(65) Prior Publication Data  
US 2024/0339082 A1  Oct. 10, 2024

(30) Foreign Application Priority Data  
Aug. 2, 2021 (JP) ................. 2021-126870

(51) Int. Cl.  
*G09G 3/3266* (2016.01)  
*G09G 3/3233* (2016.01)  
*G09G 3/3275* (2016.01)

(52) U.S. Cl.  
CPC ......... *G09G 3/3266* (2013.01); *G09G 3/3233* (2013.01); *G09G 3/3275* (2013.01); *G09G 2320/0233* (2013.01)

(58) Field of Classification Search  
CPC .. G09G 3/3266; G09G 3/3233; G09G 3/3275; G09G 2320/0233;  
(Continued)

(56) References Cited

U.S. PATENT DOCUMENTS

| 11,288,027 B1* | 3/2022 | Välimäki ................. G06F 1/163 |
| 2011/0115693 A1* | 5/2011 | Kim ....................... G09G 3/003 |
| | | 345/76 |

(Continued)

FOREIGN PATENT DOCUMENTS

| JP | 2004127657 A | 4/2004 |
| JP | 2012089527 A | 5/2012 |

(Continued)

OTHER PUBLICATIONS

International Search Report (PCT/ISA/210), International Application No. PCT/JP2022/023627, dated Aug. 9, 2022.

*Primary Examiner* — Amit Chatly  
(74) *Attorney, Agent, or Firm* — Michael Best & Friedrich LLP

(57) ABSTRACT

[Problem] The present disclosure provides a display device, an electronic device, and a display control method capable of independently controlling the display of images in a high-resolution region and a low-resolution region.  
[Solution] The present disclosure provides a display device including a pixel section having a plurality of first pixels and a plurality of second pixels, and a driving unit that drives the pixel section. The plurality of first pixels are provided corresponding to respective intersections between a plurality of first scanning lines and a plurality of first data lines. The plurality of second pixels are provided corresponding to respective intersections between a plurality of second scanning lines and a plurality of second data lines. n of the plurality of second pixels (where n is any integer) are (Continued)

provided in a region where m of the plurality of first pixels (where m is any integer) are provided.

20 Claims, 20 Drawing Sheets

(58) Field of Classification Search
CPC ... G09G 2340/0407; G09G 2340/0435; G09G 2354/00; G02B 27/01; G02B 2027/0178; G02B 5/201

See application file for complete search history.

(56) References Cited

U.S. PATENT DOCUMENTS

| | | | |
|---|---|---|---|
| 2012/0068976 A1* | 3/2012 | Chang | G06F 3/1423 345/204 |
| 2014/0035942 A1 | 2/2014 | Il-Kook | |
| 2015/0235589 A1* | 8/2015 | Cho | G09G 3/3208 345/83 |

FOREIGN PATENT DOCUMENTS

| | | | |
|---|---|---|---|
| JP | 2016519785 A | 7/2016 | |
| JP | 2018124471 A | 8/2018 | |
| JP | 2020021083 A | 2/2020 | |
| JP | 2021089398 A | 6/2021 | |

* cited by examiner

DISPLAY DEVICE, ELECTRONIC DEVICE, AND DISPLAY CONTROL METHOD

TECHNICAL FIELD

The present disclosure relates to a display device, an electronic device, and a display control method.

BACKGROUND ART

As image capturing devices are provided with higher resolutions, the amounts of data to be transferred are increasing as well. There is thus a risk that the display processing capabilities of display devices will be unable to support such data transmission amounts. Accordingly, a technique called foveated rendering has been proposed in which transmission amounts are suppressed by changing the resolution between a user's central field of view and the user's peripheral field of view.

Control is also performed to display the image in the central field of view, which has a high resolution, and the image in the peripheral field of view, which has a lower resolution than the central field of view, using the same pixels. There is thus a risk that the image display between the central field of view and the peripheral field of view will be limited.

CITATION LIST

Patent Literature

[PTL 1]
JP 2020-21083A

SUMMARY

Technical Problem

Accordingly, the present disclosure provides a display device, an electronic device, and a display control method capable of independently controlling the display of images in a high-resolution region and a low-resolution region.

Solution to Problem

To solve the above-described problem, the present disclosure provides a display device including: a pixel section having a plurality of first pixels and a plurality of second pixels; and a driving unit that drives the pixel section. The plurality of first pixels are provided corresponding to respective intersections between a plurality of first scanning lines and a plurality of first data lines. The plurality of second pixels are provided corresponding to respective intersections between a plurality of second scanning lines and a plurality of second data lines. n of the plurality of second pixels (where n is any integer) are provided in a region where m of the plurality of first pixels (where m is any integer) are provided.

The display device may further include a plurality of light-emitting elements provided corresponding to respective ones of the plurality of first pixels, and each of m of the light-emitting elements provided corresponding to the m first pixels may emit light according to a driving current supplied from the corresponding ones of the m first pixels, and emit light according to a driving current supplied from at least one of the n second pixels.

Here, n may be no greater than m.

The driving unit may include: a first vertical driving circuit that supplies, to at least the plurality of first scanning lines, a scanning signal that selects one of the plurality of first pixels; a first horizontal driving circuit that supplies, to at least the plurality of first data lines, a first data signal pertaining to a tone of first image data; a second vertical driving circuit that supplies, to at least the plurality of second scanning lines, a scanning signal that selects one of the plurality of second pixels; and a second horizontal driving circuit that supplies, to at least the plurality of second data lines, a second data signal pertaining to a tone of second image data.

The first vertical driving circuit and the first horizontal driving circuit may be capable of driving based on a first synchronization signal, and the second vertical driving circuit and the second horizontal driving circuit may be capable of driving based on a second synchronization signal.

The first synchronization signal and the second synchronization signal may have different framerates.

The light-emitting elements controlled to emit light by the first pixels and the light-emitting elements controlled to emit light by the second pixels may have different light emission periods.

The plurality of light-emitting elements may be controlled to emit light by respective ones of the plurality of first pixels, and the plurality of second pixels may be capable of simultaneously controlling light emission of at least two light-emitting elements among the plurality of light-emitting elements.

A rectifying device may be connected between the at least two light-emitting elements and the first pixel.

Color filters corresponding to the plurality of light-emitting elements may have a honeycomb structure.

The first pixel may include at least a driving transistor that applies a current based on the first data signal to one end of the corresponding light-emitting element, and the second pixel may include at least a driving transistor that applies a current based on the second data signal to one end of the corresponding light-emitting element.

The first pixel may include at least a first transistor that sets one end of the corresponding light-emitting element to a predetermined potential and a second transistor that controls a power supply to the driving transistor, and the second pixel may include at least a first transistor that sets one end of the corresponding light-emitting element to a predetermined potential and a second transistor that controls a power supply to the driving transistor.

The first pixel may include at least a first transistor that sets one end of the corresponding light-emitting element to a ground potential and a second transistor that controls a power supply to the driving transistor, and the second pixel may share at least the first transistor of the first pixel and the second transistor of the first pixel.

The display device may further include a third vertical driving circuit that controls at least the first transistor of the first pixel and the second transistor of the first pixel.

The first image data may correspond to an image of a central field of view of a captured image, and the second image data may correspond to a peripheral field of view of the captured image.

According to the present disclosure, an electronic device may include the display device.

According to the present disclosure, a display control method is provided for n of a plurality of second pixels (where n is any integer) provided in a region where m of a plurality of first pixels (where m is any integer) are provided. The display control method includes: the plurality of first pixels being driven by a driving unit according to first image data, the plurality of first pixels being provided corresponding to respective intersections between a plurality of first scanning lines and a plurality of first data lines; the plurality of second pixels being driven by the driving unit according to second image data, the plurality of second pixels being provided corresponding to respective intersections between a plurality of second scanning lines and a plurality of second data lines; and a plurality of light-emitting elements corresponding to the plurality of first pixels and the plurality of second pixels being controlled to emit light by at least one of the first pixels and the second pixels.

DESCRIPTION OF EMBODIMENTS

Embodiments of a display device, an electronic device, and a display control method will be described hereinafter with reference to the drawings. Although the following descriptions will focus on the main components of the display device and the electronic device, the display device and the electronic device may include components and functions that are not illustrated or described. The following descriptions are not intended to exclude constituent elements or functions that are not illustrated or described.

First Embodiment

Figure 1:
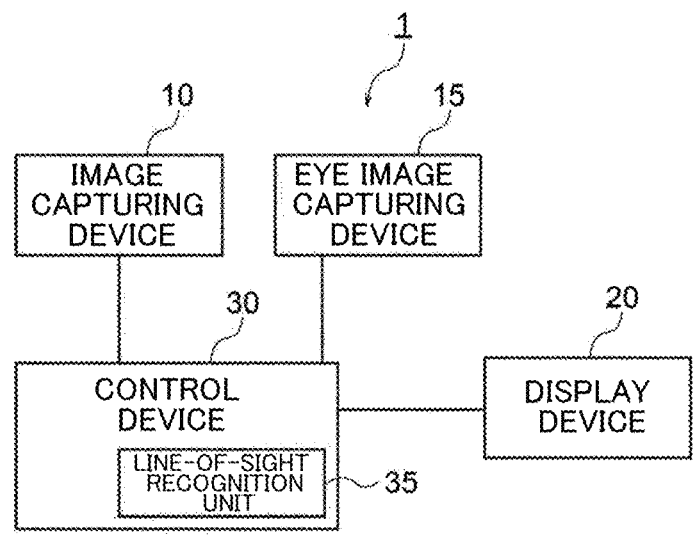
FIG. 1 is a diagram illustrating an example of the configuration of a display system according to a first embodiment of the present technique.

FIG. 1 is a diagram illustrating an example of the configuration of a display system 1 according to a first embodiment of the present technique. The display system 1 is a display system capable of independently displaying an image of a central field of view and an image of a peripheral field of view, and includes an image capturing device 10, an eye image capturing device 15, a display device 20, and a display control device 30.

The image capturing device 10 is a camera, for example, and can supply digital image data obtained by capturing a moving image to the display control device 30. The eye image capturing device 15 is a camera for capturing an image of an eye, for example, and can supply digital image data obtained by capturing a moving image of an eye of a user of the display device 20 to the display control device 30.

Figure 2:
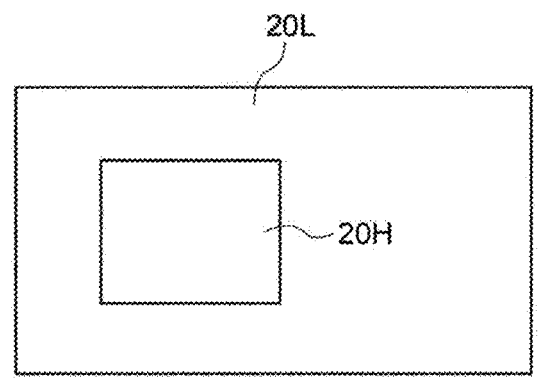
FIG. 2 is a diagram illustrating an example of a display range of a first image and a display range of a second image.

FIG. 2 is a diagram illustrating an example of a display range of a first image 20H, which has a first resolution, and a display range of a second image 20L, which has a second resolution lower than the resolution of the first image 20H. The first image 20H corresponds to the central field of view and the second image 20L corresponds to the peripheral field of view, for example. The display device 20 is a device capable of displaying the first image 20H and the second image 20L by causing light-emitting elements to emit light in units of rows using video signals based on the digital image data. The display device 20 includes current-driven light-emitting elements, for example. Organic electroluminescence elements, LED elements, semiconductor laser elements, or the like can be used as the light-emitting elements. The display device 20 may be configured for what is known as monochromatic display, or may be configured for color display. When the display device is configured for color display, a configuration can be employed in which a single color pixel is constituted by a plurality of pixels, specifically, a single color pixel is constituted by a set including a red display pixel, a green display pixel, and a blue display pixel. Furthermore, a single color pixel can be constituted by a set of these three types of pixels plus one or more additional types of pixels. The configuration of the display device 20 will be described in detail later. Additionally, although the present embodiment describes the second image 20L as having a lower resolution than the first image 20H, the technique is not limited thereto. The second image 20L may have a higher resolution than the first image 20H, for example. Furthermore, although the present embodiment describes the number of images as being two, the technique is not limited thereto. For example, as long as there are at least two image regions, the display may be divided into three image regions, for example. The display range of the first image 20H and the display range of the second image 20L may be fixed or changed as well.

The display control device 30 controls the display device 20 to display video based on the digital image data captured by the image capturing device 10. The display control device 30 includes a line-of-sight recognition unit 35. The line-of-sight recognition unit 35 recognizes a line-of-sight direction of an observer using a general line-of-sight recognition technique, based on eye image data captured by the eye image capturing device 15. For example, the line-of-sight recognition unit 35 can recognize a pupil part of an eye through binary conversion processing, and then associate a center of gravity position thereof with a line-of-sight direction.

The display control device 30 sets the region of the first image 20H based on a recognition result from the line-of-sight recognition unit 35. The display control device 30 then generates first image data for displaying the first image 20H, which is an image of the central field of view, and second image data for displaying the second image 20L, which is an image of the peripheral field of view, based on the digital image data captured by the image capturing device 10. At this time, the display device 20 can generate the first image data and the second image data at different framerates. The display device 20 can also generate the first image data and the second image data with different display duties. Note that "display duty" refers to the ratio of the emission times of the light-emitting elements. The display control device 30 according to the present embodiment can therefore transfer the first image data and the second image data to the display device 20 at different framerates, which makes it possible to reduce the amount of transferred data. The display control device 30 according to the present embodiment can also display the first image data and the second image data at different display duties, which makes it possible to extend the lifespan of the light-emitting elements in the display device 20.

The digital image data may be supplied to the display control device 30 over a network, through wireless communication, or the like. Alternatively, the digital image data may be supplied to the display control device 30 from a storage medium. At this time, the first image data for the first image 20H and the second image data for the second image 20L may be generated on the basis of different digital image data. The configuration of the display control device 30 will also be described in detail later. In the present embodiment, the digital image data may be referred to as "image data". Such a display system 1 can be used in an electronic device such as a computer system, a navigation system, a DVD player, a Blu-ray player, a home theater system, a mobile device system, a wearable device system, a virtual/augmented reality system, or the like, as will be described later.

Figure 3:
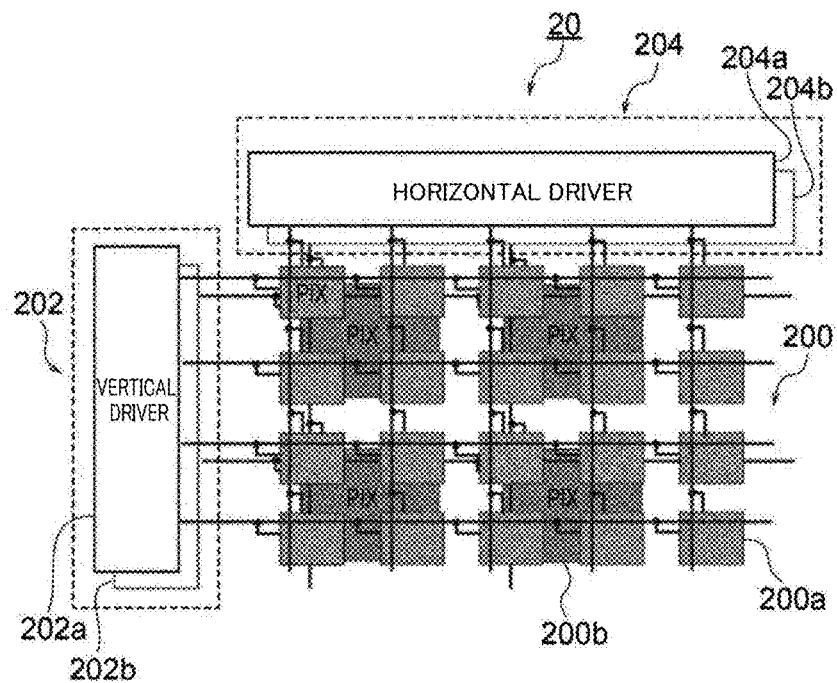
FIG. 3 is a block diagram illustrating an example of the configuration of a display device.

FIG. 3 is a block diagram illustrating an example of the configuration of the display device 20. As illustrated in FIG. 2, the display device 20 can be applied as an organic EL (OLED) display device 20 that includes an active matrix drive circuit, for example. The display device 20 includes a display panel 200 and a control circuit (not shown) that controls the operation of the display panel 200. The display panel 200 according to the present embodiment corresponds to a pixel section.

The digital first image data is supplied to the control circuit in synchronization with a first synchronization signal. Similarly, the second image data is supplied in synchronization with a second synchronization signal. The first image data and the second image data are data that define the tone levels of the pixels of the image to be displayed in the display panel 200, in 8 bits, for example. The synchronization signals are signals including a vertical synchronization signal, a horizontal synchronization signal, and a dot clock signal. The control circuit generates various control signals based on the synchronization signals and supplies the control signals to the display panel 200. The control circuit also includes a voltage generation circuit. The voltage generation circuit supplies various potentials to the display panel 200. The control circuit further generates an analog first image signal and an analog second image signal based on the first image data and the second image data.

As illustrated in FIG. 3, in the display device 20, the display panel 200, a vertical driving circuit (vertical driver) 202, and a horizontal driving circuit (horizontal driver) 204 are formed on a semiconductor substrate, e.g., a silicon substrate. The vertical driving circuit 202 includes a vertical driving circuit 202a for high resolution and a vertical driving circuit 202b for low resolution. Likewise, the horizontal driving circuit 204 includes a horizontal driving circuit 204a for high resolution and a horizontal driving circuit 204b for low resolution. In the example in FIG. 3, the display panel 200 includes a plurality of first pixels 200a for high resolution disposed in a matrix, and a plurality of second pixels 200b for low resolution disposed in a matrix. The vertical driving circuit (vertical driver) 202 and the horizontal driving circuit (horizontal driver) 204 according to the present embodiment correspond to a driving unit.

Figure 4:
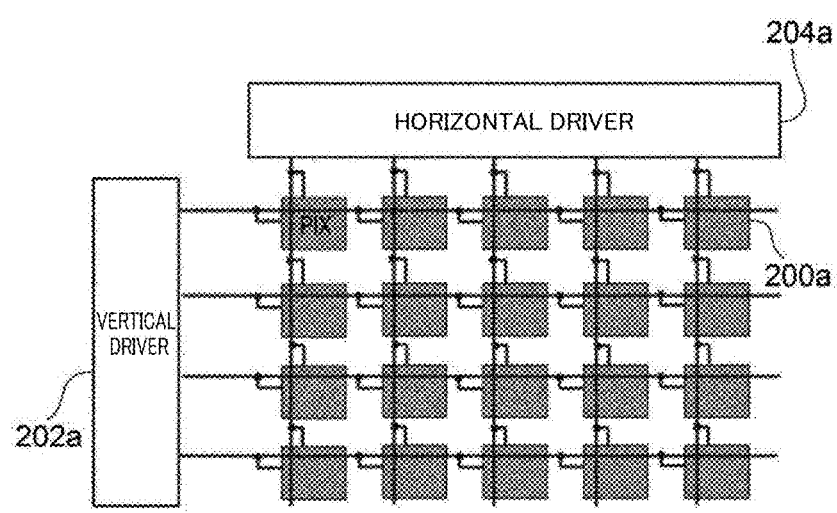
FIG. 4 is a block diagram illustrating an example of the configuration of the display device on a high-resolution side.

FIG. 4 is a block diagram illustrating an example of the configuration of the display device 20 on a high-resolution side. As illustrated in FIG. 4, a plurality of scanning lines extend from the vertical driving circuit 202a in a horizontal direction relative to the plurality of first pixels 200a for high resolution, and a plurality of data lines extend from the horizontal driving circuit 204a in a vertical direction.

To simplify the descriptions, FIG. 4 illustrates only 4×5 pixels, but in the display panel 200, m1+1 first pixels 200a in a row direction and n1+1 first pixels 200a in a column direction, for a total of (m1+1)×(n1+1) first pixels 200a, are formed on a semiconductor substrate configured by forming a semiconductor layer constituted by silicon on a base material, for example. In other words, the display panel 200 is configured including a plurality of scanning lines and a plurality of data lines disposed within the screen orthogonally to each other, and a plurality of the first pixels 200a which are disposed at each part where the two types of lines intersect and are selectively driven through the scanning lines and the data lines.

The vertical driving circuit 202a is constituted by a shift register circuit or the like, for example. When writing data signals based on tone levels of the first pixels 200a, the vertical driving circuit 202a scans the first pixels 200a in order, in units of rows, by supplying write scanning signals to each of the scanning lines in sequence. For example, the vertical driving circuit 202a controls the light emission/non-emission (extinction) of each of the first pixels 200a by supplying a first control signal to the scanning lines. Furthermore, for example, the vertical driving circuit 202a controls the first pixels 200a not to emit light in a non-emission period by supplying a second control signal to the scanning lines. Although the present embodiment describes an example of supplying the first control signal and the second control signal, the technique is not limited thereto.

As the data signals, the horizontal driving circuit 204a selectively writes, to each of the data lines, signal potentials (signal voltages) and correction potentials for the data signals based on the tone levels described earlier. In other words, the signal voltage is a voltage based on the tone level (luminance). A reference voltage is used when performing a threshold correction operation, which will be described later.

Figure 5:
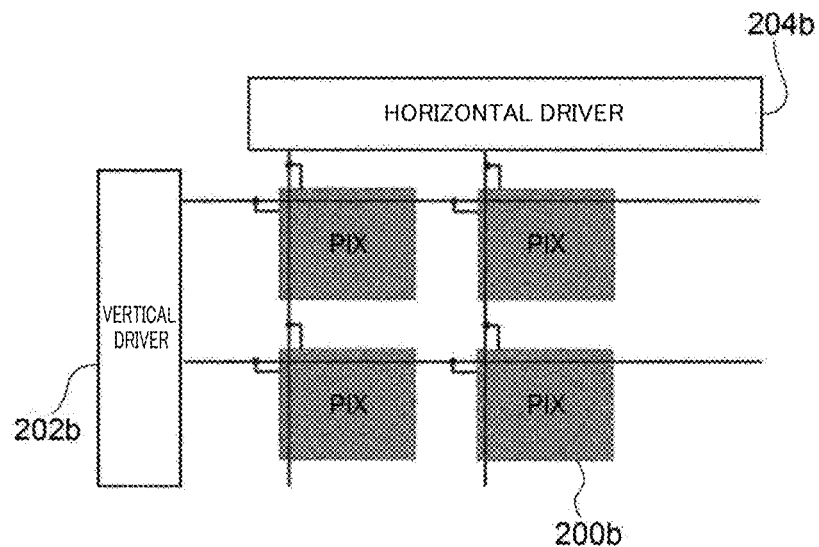
FIG. 5 is a block diagram illustrating an example of the configuration of the display device on a low-resolution side.

FIG. 5 is a block diagram illustrating an example of the configuration of the display device 20 on a low-resolution side. As illustrated in FIG. 4, a plurality of scanning lines extend from the vertical driving circuit 202b in a horizontal direction relative to the plurality of second pixels 200b for low resolution, and a plurality of data lines extend from the horizontal driving circuit 204b in a vertical direction.

To simplify the descriptions, FIG. 5 illustrates only 2×2 pixels, but in the display panel 200, m2+1 second pixels 200b in a row direction and n2+1 second pixels 200b in a column direction, for a total of (m2+1)×(n2+1) second pixels 200b, are formed on a semiconductor substrate configured by forming a semiconductor layer constituted by silicon on a base material, for example. In other words, the display panel 200 is configured including a plurality of scanning lines and a plurality of data lines disposed within the screen orthogonally to each other, and a plurality of the second pixels 200b which are disposed at each part where the two types of lines intersect and are selectively driven through the scanning lines and the data lines. In the present embodiment, for example, the number (m2+1)×(n2+1) is one-fourth the number (m1+1)×(n1+1). Although the present embodiment describes the number (m2+1)×(n2+1) as being no greater than the number (m1+1)×(n1+1), the technique is not limited thereto. For example, the configuration may be such that the number (m2+1)×(n2+1) is at least the number (m1+1)×(n1+1). In this case, the plurality of second pixels 200b are for high resolution, and the plurality of second pixels 200a are for low resolution.

The vertical driving circuit 202b has the same function as the vertical driving circuit 202a, and is constituted by a shift register circuit or the like. When writing data signals based on tone levels of the second pixels 200b, the vertical driving circuit 202b scans the second pixels 200b in order, in units of rows, by supplying write scanning signals to each of the scanning lines in sequence. The vertical driving circuit 202a controls the light emission/non-emission (extinction) of each of the second pixels 200b by supplying a first control signal to the scanning lines. Furthermore, the vertical driving circuit 202b controls the second pixels 200b not to emit light in a non-emission period by supplying a second control signal to the scanning lines.

The horizontal driving circuit 204b has the same function as the horizontal driving circuit 204a, and as the data signals, selectively writes, to each of the data lines, signal potentials (signal voltages) and correction potentials for the data signals based on the tone levels described earlier. In other words, the signal voltage is a voltage based on the tone level (luminance). In this manner, the plurality of second pixels 200b can be controlled by a control system that is independent from that for the plurality of first pixels 200a.

Figure 6:
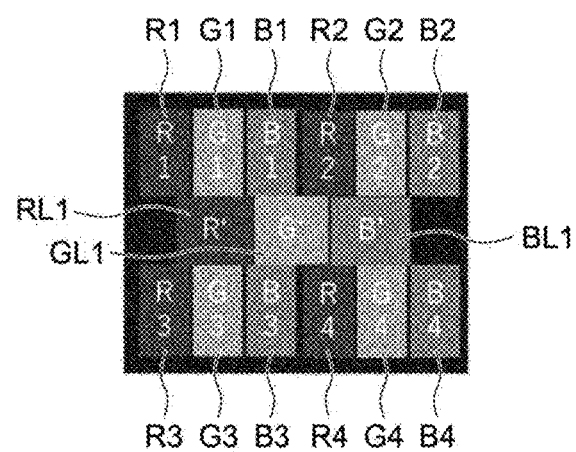
FIG. 6 is a diagram illustrating an example of the arrangement of color filters in the display device.

FIG. 6 is a diagram illustrating an example of the arrangement of color filters in the display device 20. As illustrated in FIG. 6, red filters R1 to R4 for high resolution, green filters G1 to G4 for high resolution, blue filters B1 to B4 for high resolution, and red, green, and blue filters RL1, GL1, and BL1 for low resolution constitute a single unit of the color filters.

Figure 7:
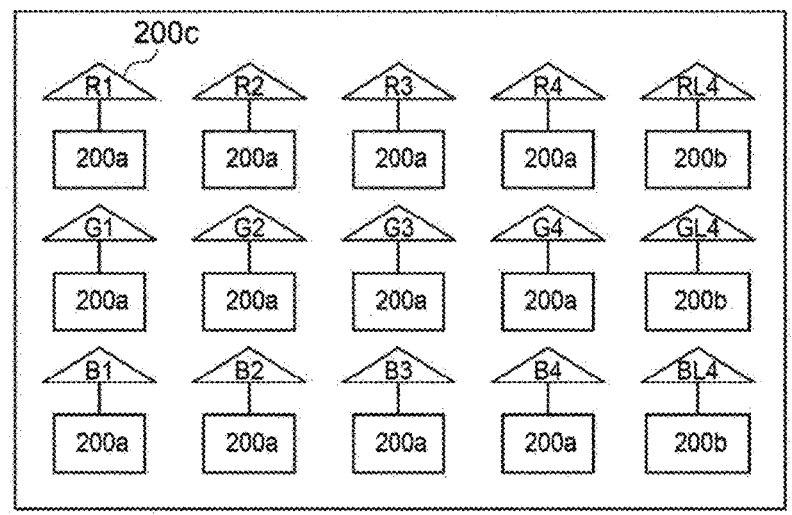
FIG. 7 is a diagram schematically illustrating light-emitting elements corresponding to the filters illustrated in FIG. 6 as triangles, and corresponding pixels as rectangles.

FIG. 7 is a diagram schematically illustrating light-emitting elements 200c corresponding to the red filters R1 to R4, the green filters G1 to G4, the blue filters B1 to B4, and the red, green, and blue filters RL1, GL1, and BL1 illustrated in FIG. 6 as triangles, and the corresponding pixels 200a and 200b as rectangles. In other words, FIG. 7 schematically illustrates an example of a circuit configuration for one of the units illustrated in FIG. 6. As illustrated in FIG. 7, light-emitting elements 200c for which light emission is controlled by the first pixels 200a are associated with the red filters R1 to R4, the green filters G1 to G4, and the blue filters B1 to B4, and light-emitting elements 200c for which light emission is controlled by the second pixels 200b are associated with the red, green, and blue filters RL1, GL1, and BL1. As a result, light emission for the red filters R1 to R4, the green filters G1 to G4, and the blue filters B1 to B4 can be individually controlled by the first pixels 200a. Likewise, light emission for the red, green, and blue filters RL1, GL1, and BL1 can be individually controlled by the second pixels 200b.

Referring again to FIG. 2, the display range of the first image 20H and the display range of the second image 20L, which has the second resolution lower than the resolution of the first image 20H, may be given different combinations of color filters for light emission. For example, light is emitted from only the green filters G1 to G4 for high resolution in the display range of the first image 20H. On the other hand, in the display range of the first image 20H, light may not be emitted from the red filters R1 to R4 and blue filters B1 to B4 for high resolution, with only the red and blue filters RL1 and BL1 for low resolution emitting light. In this case, light may be emitted from the red, green, and blue filters RL1, GL1, and BL1 for low resolution in the display range of the second image 20L.

The example of the color filter arrangement is not limited thereto, and green filters G1 to G4 for high resolution may be disposed in place of the red filters R1 to R4 for high resolution, and green filters G1 to G4 for high resolution may be disposed in place of the blue filters B1 to B4 for high resolution for high resolution. The human eye is more sensitive to green than to red and blue, and thus emitting light from the green filters G1 to G4 for high resolution in the display range of the first image 20H enables more efficient light emission control. In this manner, the display range of the first image 20H and the display range of the second image 20L, which has the second resolution lower than the resolution of the first image 20H, can be given different combinations of color filters for light emission.

Figure 8:
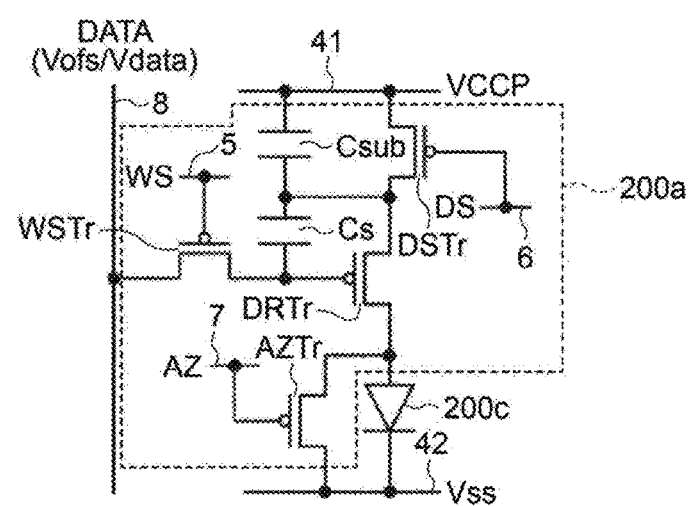
FIG. 8 is a diagram illustrating an example of the configuration of a light-emitting element corresponding to a first pixel.

FIG. 8 is a diagram illustrating an example of the configuration of the light-emitting elements 200c corresponding to the first pixels 200a. Each light-emitting element 200c is, for example, an OLED, and is a light-emitting element in which a white organic EL layer is interposed between an anode and a light-transmissive cathode in a silicon substrate, for example. As illustrated in FIG. 8, the first pixel 200a is connected to a first scanning line 5, a second scanning line 6, and a third scanning line 7 from the vertical driving circuit 202a, and to a data line 8 from the horizontal driving circuit 204a. In other words, the scanning lines described above with reference to FIG. 4 include the first scanning line 5, the second scanning line 6, and the third scanning line 7. Likewise, the data lines described above with reference to FIG. 4 include the data line 8.

The second pixel 200b has a configuration similar to that of the first pixel 200a, and as illustrated in FIG. 8, the first pixel 200b is connected to the first scanning line 5, the second scanning line 6, and the third scanning line 7 from the vertical driving circuit 202b, and to the data line 8 from the horizontal driving circuit 204a. In other words, the scanning lines described above with reference to FIG. 5 include the first scanning line 5, the second scanning line 6, and the third scanning line 7. Likewise, the data lines described above with reference to FIG. 5 include the data line 8. Descriptions for the second pixel 200b are the same as for the first pixel 200a, and thus the former will not be described below.

The first pixel 200a includes four transistors (a driving transistor DRTr, a transistor WSTr, a transistor DSTr, and a transistor AZTr), a holding capacitor Cs, an auxiliary capacitor Csub, and an OLED. Note that P-channel transistors are used as the four transistors. In other words, the first pixel 200a is constituted as Pch4Tr2C.

The source of the driving transistor DRTr is connected to a power supply line 41 through the transistor DSTr, and the drain to the anode of the OLED, and the driving transistor DRTr controls current flowing in the OLED. A high-potential power supply (VCCP) is supplied to the power supply line 41. The cathode of the OLED is connected to a power supply line 42 and serves as a common electrode, and is set to a low-potential power supply (Vss).

The gate of the transistor WSTr is connected to the first scanning line 5, one of the source or the drain is connected to the data line 8, and the other of the source or the drain is connected to the gate of the driving transistor DRTr. The transistor WSTr writes a data line potential (tone potential) to the gate of the driving transistor DRTr according to a write scanning signal WS.

The gate of the transistor DSTr (a second transistor) is connected to the second scanning line 6, one of the source or the drain is connected to the power supply line 41, the other of the source or the drain is connected to the source of the driving transistor DRTr, and the transistor DSTr controls the supply of power to the driving transistor DRTr.

The gate of the transistor AZTr (a first transistor) is connected to the third scanning line 7, one of the source or the drain is connected to the drain of the driving transistor DRTr and the anode of the OLED, and the other of the source or the drain is connected to the power supply line 42.

The holding capacitor Cs is connected between the gate and the source of the driving transistor DRTr, and holds a gate-source voltage Vgs across DRTr. The auxiliary capacitor Csub is connected between the source of the driving transistor DRTr and a node of the fixed power supply (Vss), and has a function of suppressing fluctuations in the source voltage of the driving transistor DRTr and setting the gate-source voltage Vgs across the driving transistor DRTr to a threshold voltage Vth of the driving transistor DRTr.

As described with reference to FIG. 6, the red filters R1 to R4 for high resolution, the green filters G1 to G4 for high resolution, the blue filters B1 to B4 for high resolution, and the red, green, and blue filters RL1, GL1, and BL1 for low resolution constitute a single unit. In this case, the first pixels 200a and the second pixels 200b corresponding to those color filters may also be disposed so as to correspond to those color filters. Alternatively, parts of the circuitry components constituting the first pixels 200a and the second pixels 200b may be disposed so as to correspond to the color filters. For example, one of the driving transistor DRTr, the transistor WSTr, the transistor DSTr, or the transistor AZTr constituting each of the first pixels 200a and second pixels 200b may be disposed so as to correspond to the positions of the color filters. Having the arrangement of the circuit configuration also correspond to the positions of the color filters makes it possible to make the circuit arrangement more efficient.

In the display device 20, in each of the first pixels 200a, the light emission luminance of the OLED serving as the light-emitting element 200c is controlled by the current controlled by the driving transistor DRTr. As such, if the threshold voltage Vth of the driving transistor DRTr varies from pixel to pixel in the first pixels 200a, the light emission luminance will also vary from pixel to pixel, which reduces the uniformity of the screen. Accordingly, the display device 20 performs a Vth correction operation in conjunction with line-sequential scanning to reduce variations in the light emission luminance caused by variations in the threshold voltage Vth of the driving transistor DRTr.

A period for Vth correction for the driving transistor DRTr is constituted by a Vth correction preparation period and a Vth correction period. "Vth correction preparation" refers to resetting the gate voltage of the driving transistor DRTr and resetting the source voltage of the driving transistor DRTr. "Vth correction", meanwhile, refers to a correction operation that brings the gate-source voltage Vgs across the driving transistor DRTr closer to the threshold voltage Vth of the driving transistor DRTr.

Figure 9:
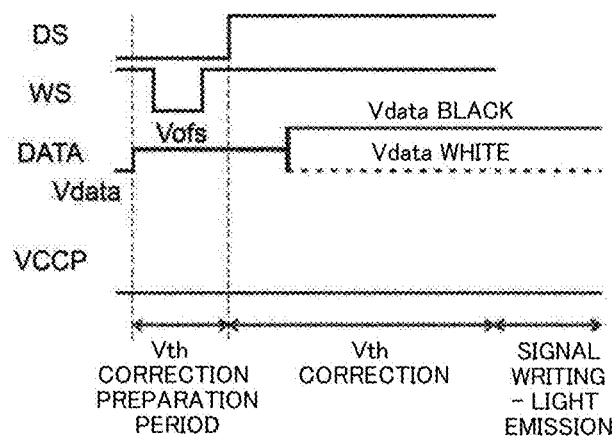
FIG. 9 is a diagram illustrating an example of the driving timing of the first pixel, from a correction preparation period of a driving transistor to the writing of a data signal according to a tone level.

FIG. 9 is a diagram illustrating an example of the driving timing of the first pixels 200a, from the Vth correction preparation period for the driving transistor DRTr to the writing of the data signal according to the tone level. First, the sequence shifts to the Vth correction preparation period by entering a new field of the line-sequential scanning. In the Vth correction preparation period, a reference voltage Vofs is written to the data line 8 by the horizontal driving circuit 204a. In this state, the transistor WSTr (see FIG. 8) is turned on by the write scanning signal WS from the vertical driving circuit 202a, and a gate voltage Vg of the driving transistor DRTr is reset to the reference voltage Vofs. At this time, the transistor DSTr is turned on by a first control signal DS from the vertical driving circuit 202a, and the source voltage of the driving transistor DRTr is reset to a power supply voltage VCCP. This completes the Vth correction preparations.

Once the Vth correction preparations are complete, the sequence shifts to the Vth correction period. In the Vth correction period, the transistor DSTr is turned off by the first control signal DS from the vertical driving circuit 202a. This causes the source voltage of the driving transistor DRTr to start to drop, and the gate-source voltage Vgs converges on the threshold voltage Vth. A voltage equivalent to the threshold voltage Vth is held by the holding capacitor Cs.

Note that the horizontal driving circuit 204a switches the write voltage to the data line 8 from the reference voltage Vofs to a signal voltage Vdata in the Vth correction period.

By holding a voltage equivalent to the threshold voltage Vth in the holding capacitor Cs, the dependence of a drain-source current Ids flowing in the driving transistor DRTr on the threshold voltage Vth can be suppressed when driving the driving transistor DRTr with the signal voltage Vdata.

Figure 10:
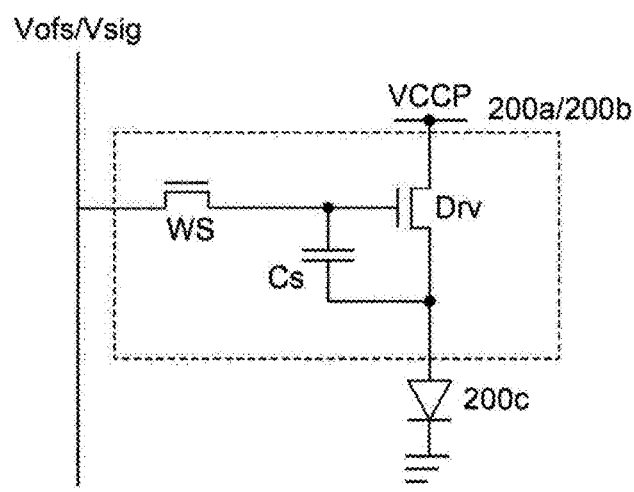
FIG. 10 is a diagram illustrating an example of the configuration of second pixels.
Figure 11:
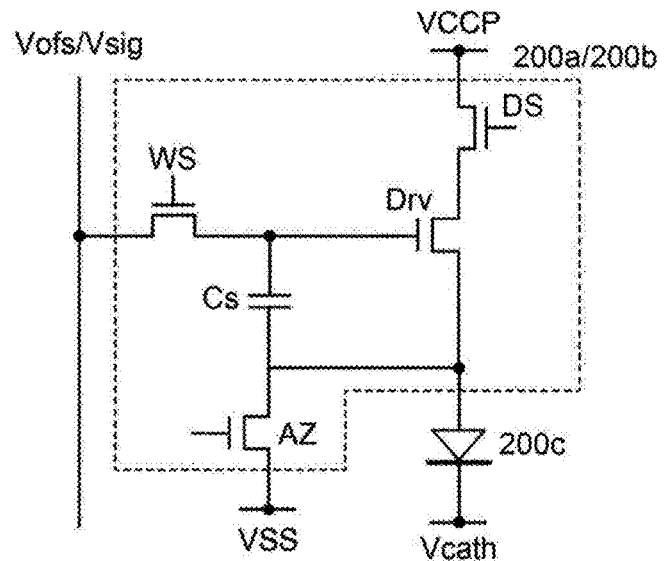
FIG. 11 is a diagram illustrating an example of the configuration of third pixels.
Figure 12:
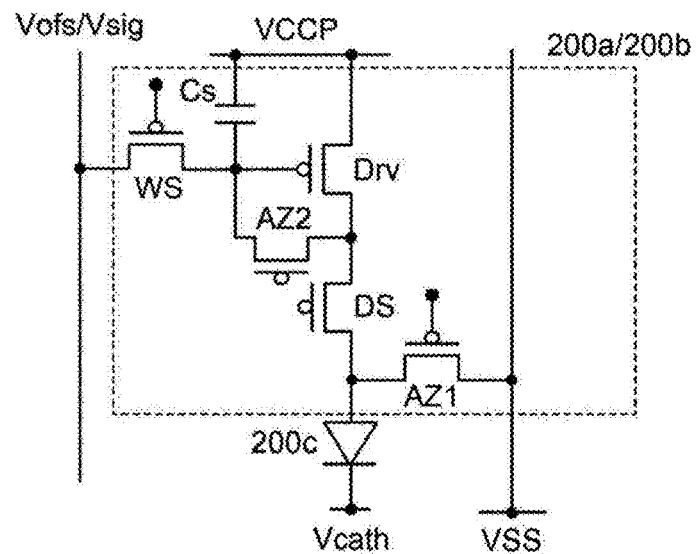
FIG. 12 is a diagram illustrating an example of the configuration of fourth pixels.
Figure 13:
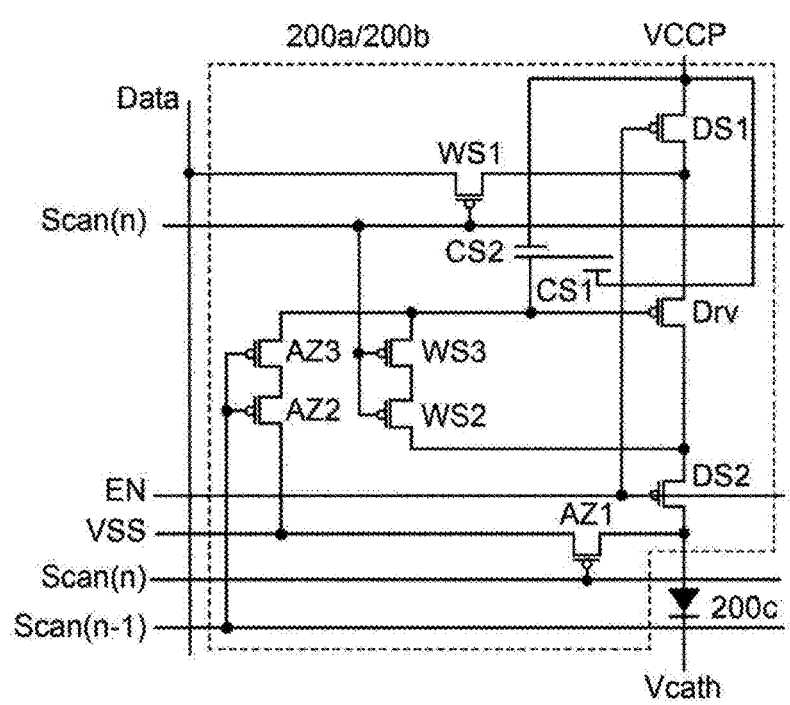
FIG. 13 is a diagram illustrating an example of the configuration of fifth pixels.

FIG. 10 is a diagram illustrating an example of the configuration of second pixels 200a and 200b. FIG. 11 is a diagram similarly illustrating an example of the configuration of third pixels 200a and 200b. FIG. 12 is a diagram similarly illustrating an example of the configuration of fourth pixels 200a and 200b. FIG. 13 is a diagram similarly illustrating an example of the configuration of fifth pixels 200a and 200b. As illustrated in FIGS. 10 to 13 and the like, the configurations of the pixels 200a and 200b are not limited as long as the light-emitting elements 200c can be controlled according to the control of the scanning lines and the data lines. The pixels 200a and 200b may also be configured having different structures.

Figure 14:
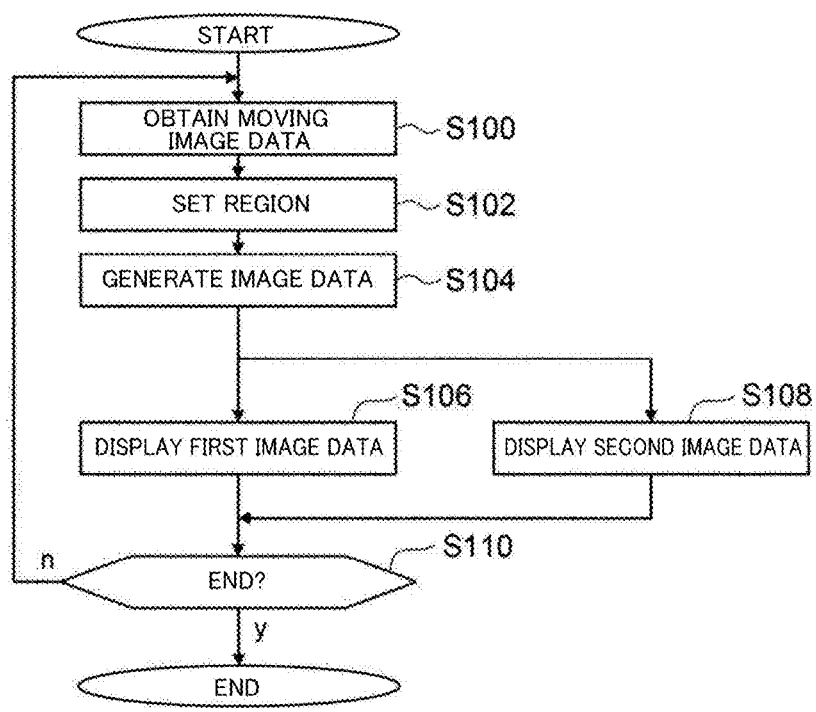
FIG. 14 is a flowchart illustrating an example of processing according to the first embodiment.

The foregoing has described the configuration of the present embodiment, and an example of processing will be described hereinafter. FIG. 14 is a flowchart illustrating an example of processing according to the first embodiment. As illustrated in FIG. 14, first, the control device 30 obtains moving image data captured by the image capturing device 10 and image data obtained by the eye image capturing device 15 (step S100). Next, the line-of-sight recognition unit 35 of the control device 30 recognizes the line-of-sight direction of the observer based on the image data obtained by the eye image capturing device 15. The control device 30 then sets the range of the first image data (step S102) and generates the first image data and the second image data (step S104).

The first image data is then supplied to the control circuit of the display device 20 in synchronization with the first synchronization signal. Similarly, the second image data is supplied in synchronization with the second synchronization signal. The vertical driving circuit 202a and the horizontal driving circuit 204a for high resolution then perform display control of the first image data in synchronization with the first synchronization signal (step S106). On the other hand, the vertical driving circuit 202b and the horizontal driving circuit 204b for low resolution then perform display control of the second image data in synchronization with the second synchronization signal, independent from the first synchronization signal (step S108).

Next, the control device 30 determines whether to end the display (step S110). If it is determined that the display is not to end (n in step S110), the processing is repeated from step S100, whereas if it is determined that the display is to end (y in step S110), the overall sequence ends.

As described above, according to the present embodiment, the plurality of first pixels 200a for high resolution and the plurality of second pixels 200b for low resolution are configured independently. The plurality of first pixels 200a for high resolution are controlled by the vertical driving circuit 202a and the horizontal driving circuit 204a for high resolution, and the plurality of second pixels 200b for low resolution are controlled by the vertical driving circuit 202b and the horizontal driving circuit 204b for low resolution. As a result, the high resolution first image 20H and the low resolution second image 20L can be displayed in the display device 20 by independent control systems.

Second Embodiment

A display system 1 according to a second embodiment differs from the display system 1 according to the first embodiment in that the plurality of light-emitting elements 200c are shared by a plurality of pixels 200a for high resolution and a plurality of pixels 200b for low resolution. The following will describe the differences from the display system 1 according to the first embodiment.

Figure 15:
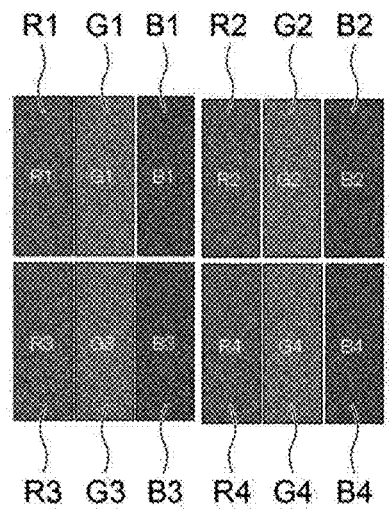
FIG. 15 is a diagram illustrating an example of the arrangement of color filters in a display device according to a second embodiment.

FIG. 15 is a diagram illustrating an example of the arrangement of color filters in the display device 20 according to the second embodiment. As illustrated in FIG. 15, red filters R1 to R4 for high resolution, green filters G1 to G4 for high resolution, and blue filters B1 to B4 for high resolution constitute a single unit of the color filters.

Figure 16:
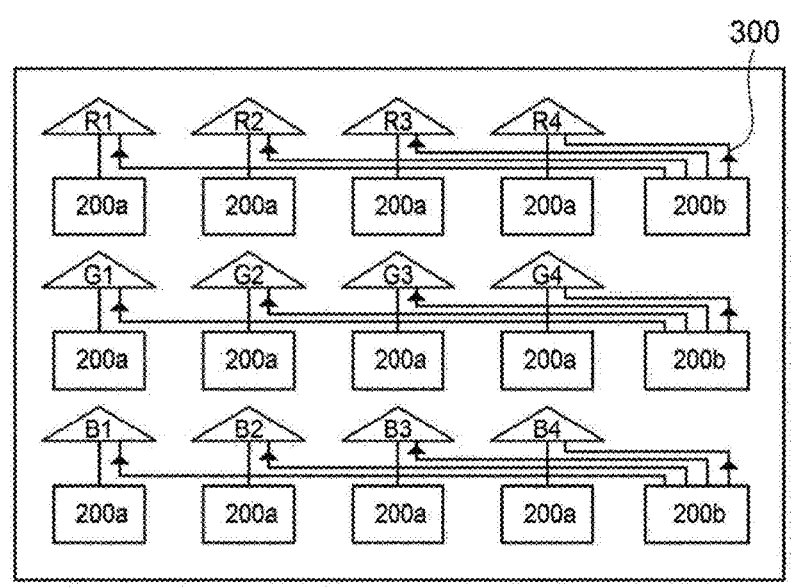
FIG. 16 is a diagram illustrating light-emitting elements corresponding to the filters illustrated in FIG. 15 as triangles, and corresponding pixels as rectangles.

FIG. 16 is a diagram illustrating the light-emitting elements 200c corresponding to the red filters R1 to R4, the green filters G1 to G4, and the blue filters B1 to B4 illustrated in FIG. 15 as triangles, and the corresponding pixels 200a and 200b as rectangles. As illustrated in FIG. 16, the light-emitting elements 200c for which light emission is controlled by each of the first pixels 200a are associated with the red filters R1 to R4, the green filters G1 to G4, and the blue filters B1 to B4. Furthermore, a single second pixel 200b is connected to the red filters R1 to R4, a single second pixel 200b is connected to the green filters G1 to G4, and a single second pixel 200b is connected to the blue filters B1 to B4. A diode 300 for applying current in the direction of the light-emitting element 200c is disposed between the second pixel 200b and the light-emitting element 200c. The diode 300 suppresses reverse current. As a result, control current from the first pixel 200a is suppressed from being transmitted to the second pixel 200b. Therefore, even if the light-emitting elements 200c are shared by the first pixels 200a and the second pixels 200b, situations where the light emission controls performed by the first pixels 200a and the second pixels 200b for the light-emitting elements 200c interfere with each other is suppressed. The diode 300 according to the present embodiment corresponds to a rectifying device.

In this manner, each of the first pixels 200a controls the light emission of a corresponding one of the light-emitting elements 200c, and thus a high resolution is maintained. Here, providing the diodes suppresses situations where current is supplied to other light-emitting elements 200c via the light-emitting element 200c and the second pixel 200b. On the other hand, each of the second pixels 200b controls the light emission of a corresponding four light-emitting elements 200c, resulting in a low resolution.

Figure 17:
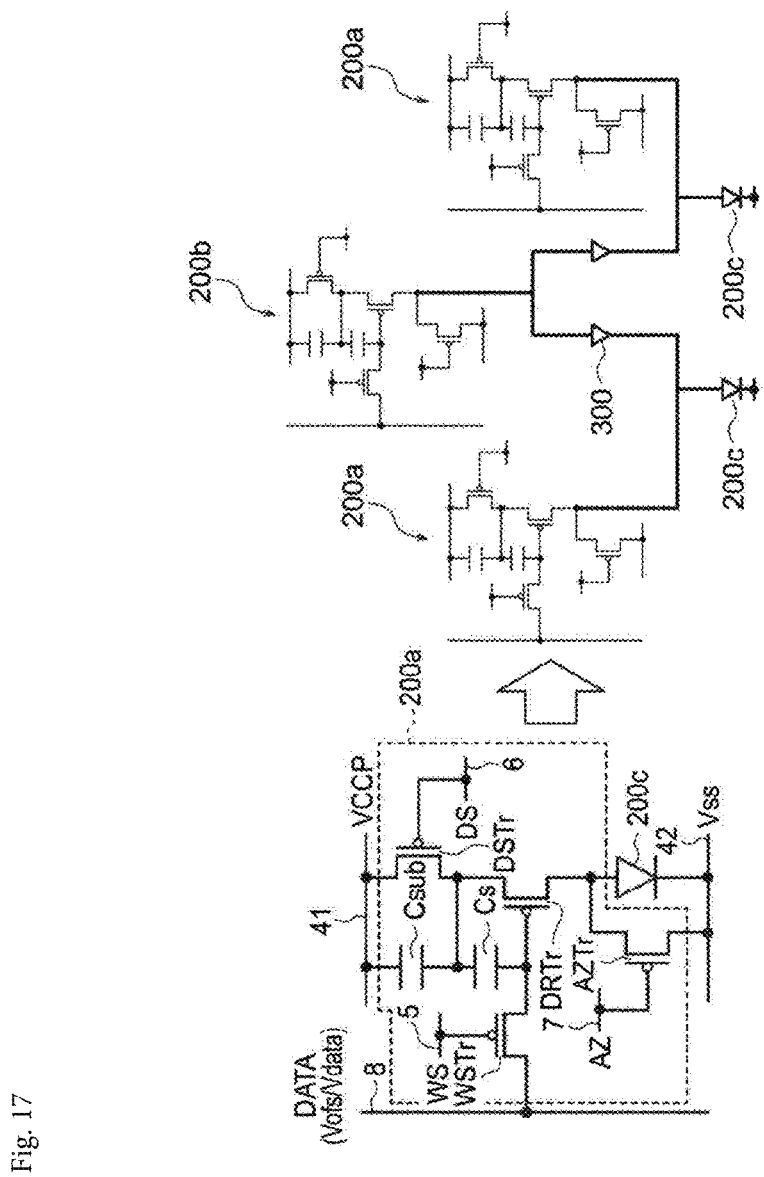
FIG. 17 is a diagram illustrating an example of the configuration of a first pixel and a second pixel illustrated in FIG. 16.

FIG. 17 is a diagram illustrating an example of the configurations of the first pixel 200a and the second pixel 200b illustrated in FIG. 16. This diagram illustrates part of the first pixel 200a corresponding to the red filters R1 to R4 and the second pixel 200b corresponding to the red filters R1 to R4. As illustrated in FIGS. 16 and 17, the light-emitting elements 200c are shared by the first pixels 200a and the second pixels 200b. The second pixel 200b can therefore be configured so as not to include the light-emitting element 200c.

As described above, according to the present embodiment, the plurality of light-emitting elements 200c are shared by the plurality of pixels 200a for high resolution and the plurality of pixels 200b for low resolution. This eliminates the need for color filters for low resolution and corresponding light-emitting elements 200c, which in turn makes it possible to simplify the configuration of the display device 20.

Third Embodiment

A display system 1 according to a third embodiment differs from the display system 1 according to the second embodiment in that the red filters R1 to R4, the green filters G1 to G4, and the blue filters B1 to B4 are configured having a honeycomb structure. The following will describe the differences from the display system 1 according to the second embodiment.

Figure 18:
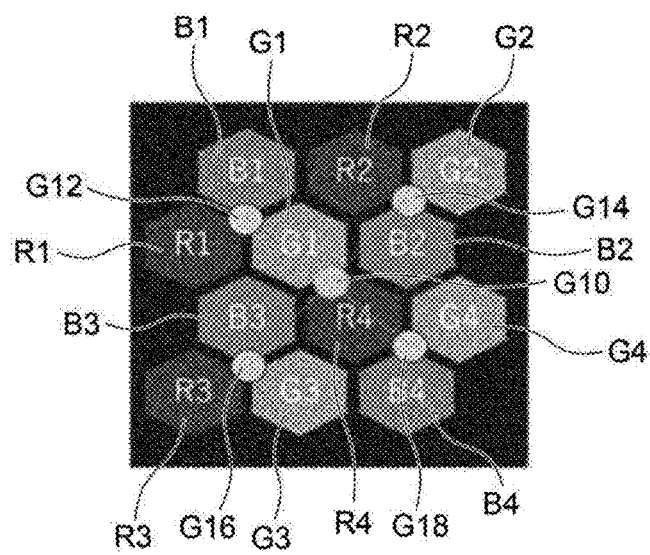
FIG. 18 is a diagram illustrating an example of the arrangement of color filters in a display device according to a third embodiment.

FIG. 18 is a diagram illustrating an example of the arrangement of color filters in the display device 20 according to the third embodiment. As illustrated in FIG. 18, red filters R1 to R4 for high resolution, green filters G1 to G4 for high resolution, and blue filters B1 to B4 for high resolution are configured such that the color filters have a honeycomb structure. A center of gravity G10 is the center of gravity for all the filters; G12 is the center of gravity for the filters R1, G1, and B1; G14 is the center of gravity for the filters R2, G2, and B2; G16 is the center of gravity for the filters R3, G3, and B3; and G18 is the center of gravity for the filters R4, G4, and B4.

Figure 19:
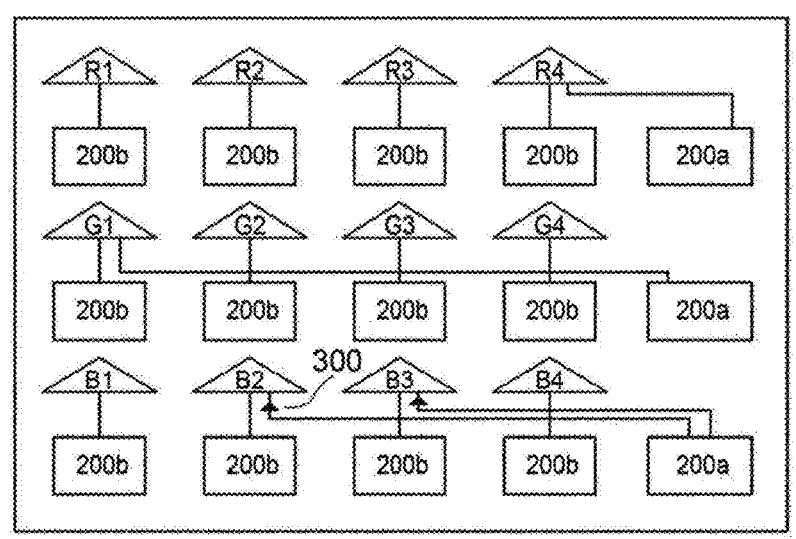
FIG. 19 is a diagram illustrating light-emitting elements corresponding to the filters illustrated in FIG. 18 as triangles, and corresponding pixels as rectangles.

FIG. 19 is a diagram illustrating the light-emitting elements 200c corresponding to the red filters R1 to R4, the green filters G1 to G4, and the blue filters B1 to B4 illustrated in FIG. 18 as triangles, and the corresponding pixels 200a and 200b as rectangles. As illustrated in FIG. 19, the light-emitting elements 200c for which light emission is controlled by each of the first pixels 200a are associated with the red filters R1 to R4, the green filters G1 to G4, and the blue filters B1 to B4. Furthermore, a single second pixel 200b is connected to the light-emitting element 200c corresponding to the red filter R4, a single second pixel 200b is connected to the light-emitting element 200c corresponding to the green filter G1, and a single second pixel 200b is connected to the light-emitting element 200c corresponding to the blue filters B2 and B3. A diode 300 for applying current in the direction of the light-emitting element 200c is disposed between the second pixel 200b and the light-emitting element 200c corresponding to the blue filters B2 and B3.

Figure 20:
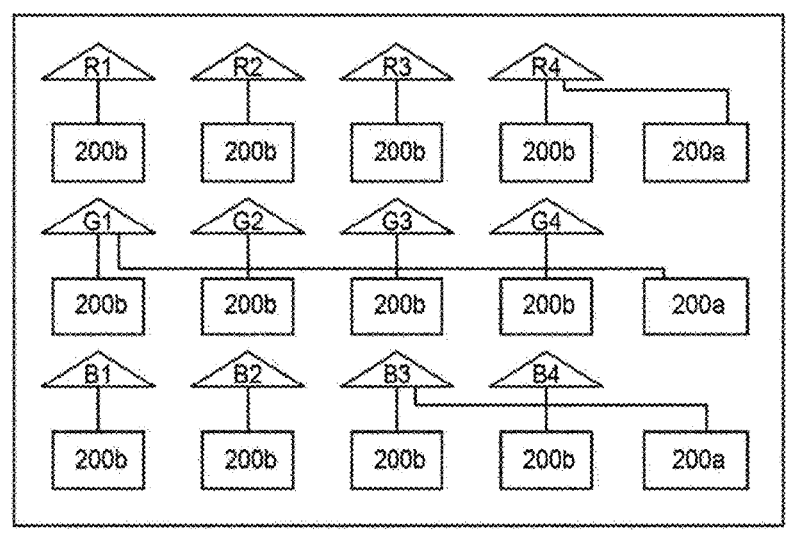
FIG. 20 is a diagram illustrating an example of connections different from that illustrated in FIG. 19.

FIG. 20 is a diagram illustrating an example of connections different from that illustrated in FIG. 19. This diagram illustrates the light-emitting elements 200c corresponding to the red filters R1 to R4, the green filters G1 to G4, and the blue filters B1 to B4 illustrated in FIG. 18 as triangles, and the corresponding pixels as rectangles. As illustrated in FIG. 20, the light-emitting elements 200c for which light emission is controlled by each of the first pixels 200a are associated with the red filters R1 to R4, the green filters G1 to G4, and the blue filters B1 to B4. Furthermore, a single second pixel 200b is connected to the red filter R4, a single second pixel 200b is connected to the green filter G1, and a single second pixel 200b is connected to the blue filter B3.

Figure 21:
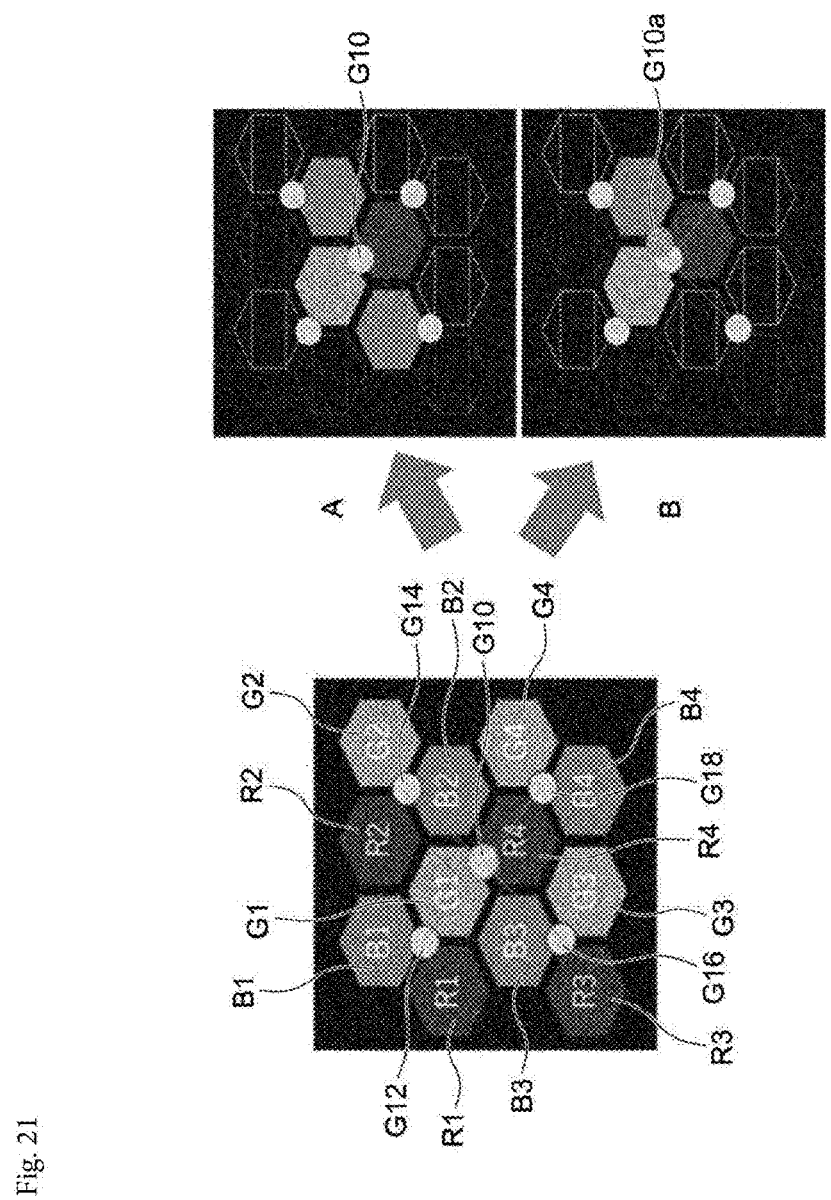
FIG. 21 is a diagram illustrating an example of light emission according to the connection example illustrated in FIG. 19, and an example of light emission according to the connection example illustrated in FIG. 20.

FIG. 21 is a diagram illustrating an example of light emission according to the connection example illustrated in FIG. 19, and an example of light emission according to the connection example illustrated in FIG. 20. As indicated by A in FIG. 21, when the red filter R4, the green filter G1, and the blue filters B2 and B3 are caused to emit light by a single second pixel 200b, the result coincides with the center of gravity G10 of all the filters. On the other hand, as indicated by B in FIG. 21, when the red filter R4, the green filter G1, and the blue filter B2 are caused to emit light by a single second pixel 200b, the result shifts from the center of gravity G10 of all the filters to a center of gravity G10a. In this manner, when the blue filters B2 and B3 are caused to emit light, the result coincides with the center of gravity 10, which suppresses fluctuations in the image between low-resolution and high-resolution display. On the other hand, the diode 300 is not needed when only the blue filter B2 is caused to emit light.

As described above, the red filters R1 to R4, the green filters G1 to G4, and the blue filters B1 to B4 according to the present embodiment are configured having a honeycomb structure. This makes it possible to ensure that the center of gravity 10 of the filters caused to emit light when a low-resolution image is displayed, and all the filters are therefore not caused to emit light, coincides with the center of gravity 10 of the filters caused to emit light when a high-resolution image is displayed.

Fourth Embodiment

A display system 1 according to a fourth embodiment differs from the display system 1 according to the second embodiment in that when the plurality of light-emitting elements 200c are shared by a plurality of first pixels 200a for high resolution and a plurality of second pixels 200b for low resolution, part of the circuit configuration of the second pixels 200b is shared with the first pixels 200a. The following will describe the differences from the display system 1 according to the second embodiment.

Figure 22:
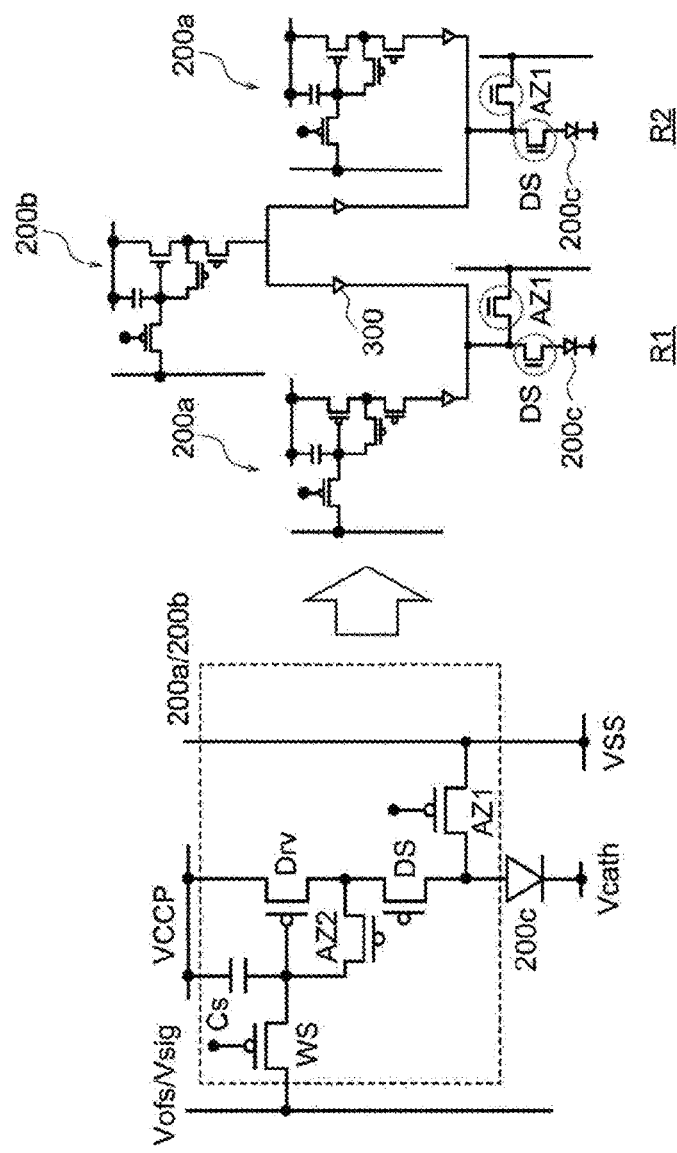
FIG. 22 is a diagram illustrating an example of the configuration of the first pixel corresponding to red filters and the configuration of the second pixel corresponding to red filters, in the case of the connection example illustrated in FIG. 16.

FIG. 22 is a diagram illustrating an example of the configuration of the first pixel 200a corresponding to the red filters R1 and R2, and the configuration of the second pixel 200b corresponding to the red filters R1 to R4, in the case of the connection example illustrated in FIG. 16. In other words, the configuration of the first pixel 200a corresponding to the red filters R3 and R4 is not illustrated in FIG. 22. As illustrated in FIG. 22, transistors DS and AZ1 of the second pixel 200b are shared with the first pixel 200a.

Figure 23:
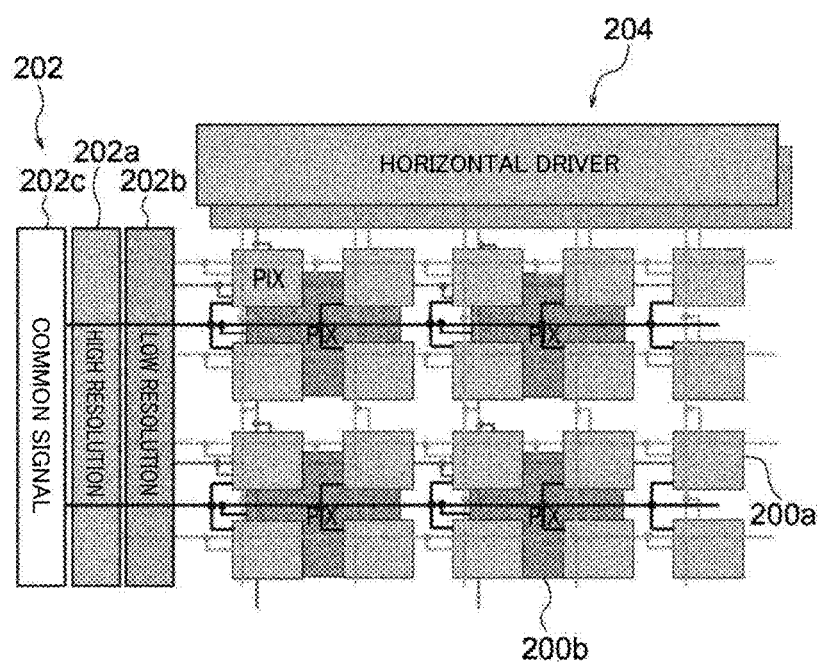
FIG. 23 is a diagram illustrating an example of the configuration of a vertical driving circuit according to the configuration example in FIG. 22.

FIG. 23 is a diagram illustrating an example of the configuration of the vertical driving circuit 202 according to the configuration example in FIG. 22. As illustrated in FIG. 23, this differs from the display system 1 according to the second embodiment in that a vertical driving circuit 202c is further provided. The vertical driving circuit 202c generates gate signals of the transistors DS and AZ1 of the shared second pixel 200b. This eliminates the need to configure redundant shift registers and the like for the vertical driving circuit 202, and the vertical driving circuit 202 can therefore be made more compact.

Figure 24:
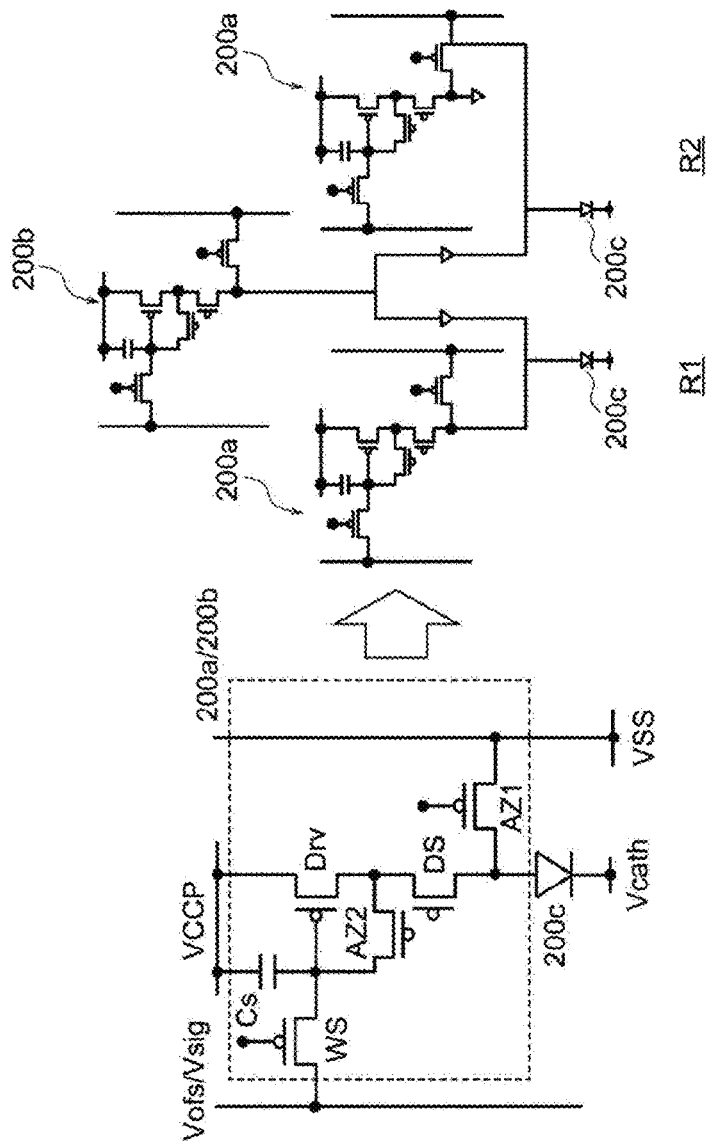
FIG. 24 is a diagram illustrating an example of the configuration of the first pixel corresponding to red filters and the configuration of the second pixel corresponding to red filters, in the case of the connection example illustrated in FIG. 16.

FIG. 24 is a diagram illustrating an example of the configuration of the first pixel 200a corresponding to the red filters R1 and R2, and the configuration of the second pixel 200b corresponding to the red filters R1 to R4, in the case of the connection example illustrated in FIG. 16. FIG. 24 illustrates an example in which the first pixels 200a and the second pixels 200b include the transistors DS and AZ1. In this case, the gate signals of each of the first pixels 200a and the second pixels 200b can be shared by the vertical driving circuit 202c. This eliminates the need to configure redundant shift registers and the like for the vertical driving circuit 202, and the vertical driving circuit 202 can therefore be made more compact.

As described above, according to the present embodiment, the gate signals of the first pixel 200a and the second pixel 200b, and the plurality of transistors DS and AZ1, are controlled by common signals from the vertical driving circuit 202c. This eliminates the need to configure redundant shift registers and the like for the vertical driving circuit 202, and the vertical driving circuit 202 can therefore be made more compact. Although the present embodiment describes an example of the arrangement of the color filters, the first pixels 200*a* and the second pixels 200*b* corresponding to the color filters may be arranged in the same manner as the color filters. Alternatively, parts of the circuit configurations of the first pixels 200*a* and the second pixels 200*b* corresponding to the color filters may be arranged in the same manner as the color filters. Furthermore, the arrangement according to the present embodiment is merely an example, and the technique is not limited thereto. The combination of the circuit configuration and the arrangement of the color filters may be different.

(Electronic Device)

Specific examples of electronic devices and the like in which the display device 20 according to the present embodiment is applied as a display unit will be described hereinafter.

Specific Example 1

Figure 25A:
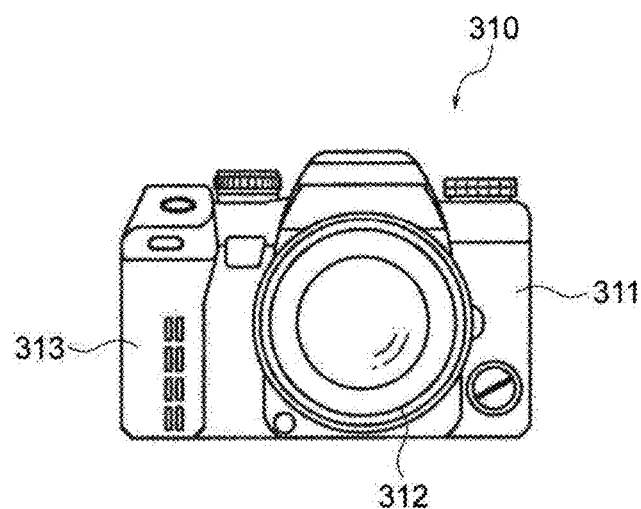
FIG. 25A is a diagram illustrating an example of the appearance of a digital still camera.
Figure 25B:
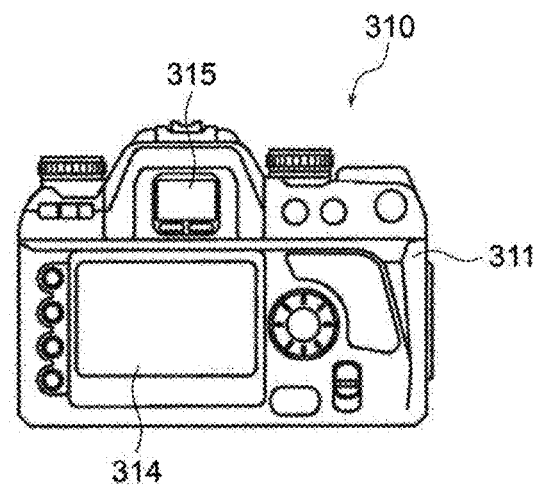
FIG. 25B is a diagram illustrating an example of the appearance of the digital still camera.

FIGS. 25A and 25B are diagrams illustrating an example of the appearance of a digital still camera 310. The digital still camera 310 is an interchangeable-lens single-lens reflex type, and includes, for example, an interchangeable shooting lens unit (interchangeable lens) 312 in substantially the center of a right-front side, and a grip part 313 for a photographer to hold on a left-front side, of a camera body unit (camera body) 311.

A monitor 314 is provided at a position shifted to the left from the center on a rear side of the camera body unit 311. An electronic viewfinder (eyepiece window) 315 is provided above the monitor 314. By looking through the electronic viewfinder 315, the photographer can see an optical image of a subject guided by the shooting lens unit 312 and decide on a composition. The display device 20 according to any one of the foregoing embodiments and variations thereon can be used as the electronic viewfinder 315.

Specific Example 2

Figure 26:
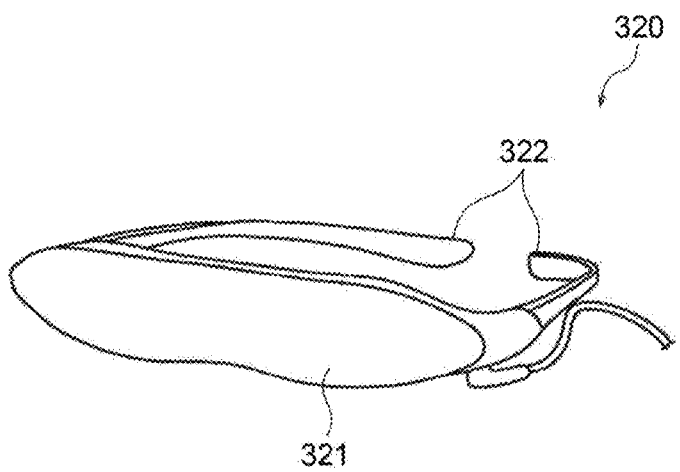
FIG. 26 is a diagram illustrating an example of the appearance of a head-mounted display.

FIG. 26 illustrates an example of the appearance of a head-mounted display 320. The head-mounted display 320 includes, for example, temple parts 322 on both sides of an eyeglasses-shaped display unit 321 for wearing the display on a user's head area. The display device 20 according to any one of the foregoing embodiments and variations thereon can be used as the display unit 321.

Specific Example 3

Figure 27:
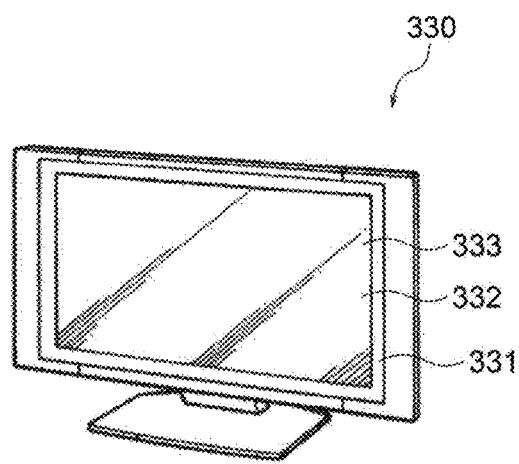
FIG. 27 is a diagram illustrating an example of the appearance of a television device.

FIG. 27 illustrates an example of the appearance of a television device 330. The television device 330 includes, for example, an image display screen unit 331 including a front panel 332 and a filter glass 333, and the image display screen unit 331 is constituted by the display device 20 according to any one of the foregoing embodiments and variations thereon.

Specific Example 4

Figure 28:
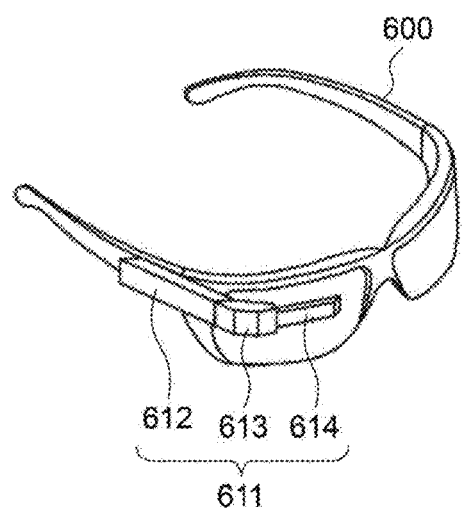
FIG. 28 is an exterior view of a see-through head-mounted display.

FIG. 28 is an exterior view of a see-through head-mounted display. A see-through head-mounted display 611 includes a main body unit 612, an arm 613, and a lens barrel 614. The main body unit 612 is connected to the arm 613 and eyeglasses 600. Specifically, an end of the main body unit 612 in a longer direction is coupled to the arm 613, and one side surface of the main body unit 612 is connected to the eyeglasses 600 by a connecting member. Note that the main body unit 612 may be directly attached to a person's head area.

The main body unit 612 contains a control board for controlling operations of the see-through head-mounted display 511, a display unit, and the like. The arm 613 connects the main body unit 612 to the lens barrel 614, and supports the lens barrel 614. Specifically, the arm 613 is coupled to both an end part of the main body unit 612 and an end part of the lens barrel 614, and anchors the lens barrel 614. The arm 613 also contains a signal line for communicating data pertaining to images provided from the main body unit 612 to the lens barrel 614.

The lens barrel 614 projects image light provided from the main body unit 612 via the arm 613 through an ocular lens toward an eye of a user wearing the see-through head-mounted display 611. In this see-through head-mounted display 611, the display device 20 of the present disclosure can be used as the display unit of the main body unit 612.

Specific Example 5

Figure 29:
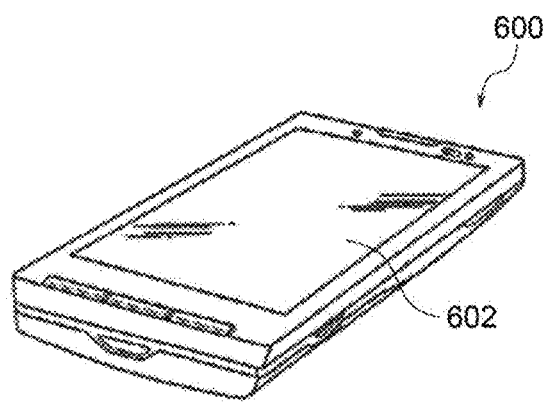
FIG. 29 is an exterior view of a smartphone.

The display device 20 according to the present embodiment can be applied in a display unit included in an electronic device such as a smartphone, for example. Specifically, as illustrated in FIG. 29, a smartphone 600 includes a display unit 602 that displays various information, an operation unit constituted by buttons and the like that accept operation inputs made by a user, and the like. The display unit 602 can be the display device 20 according to the present embodiment.

Specific Example 6

Figure 30:
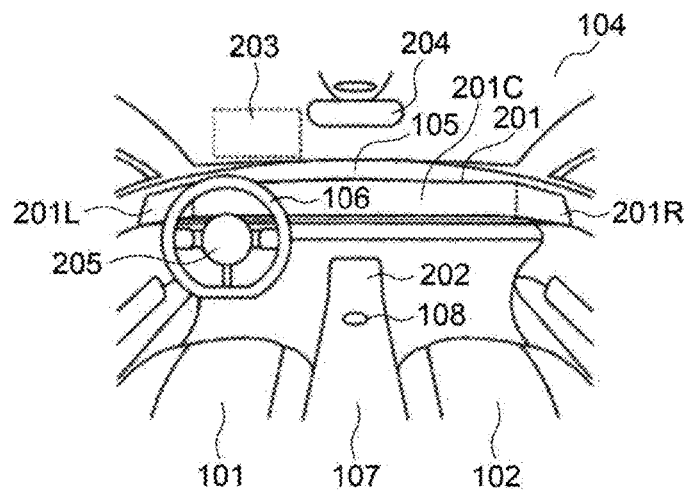
FIG. 30 is a diagram illustrating the interior of a vehicle from the rear to the front of the vehicle.
Figure 31:
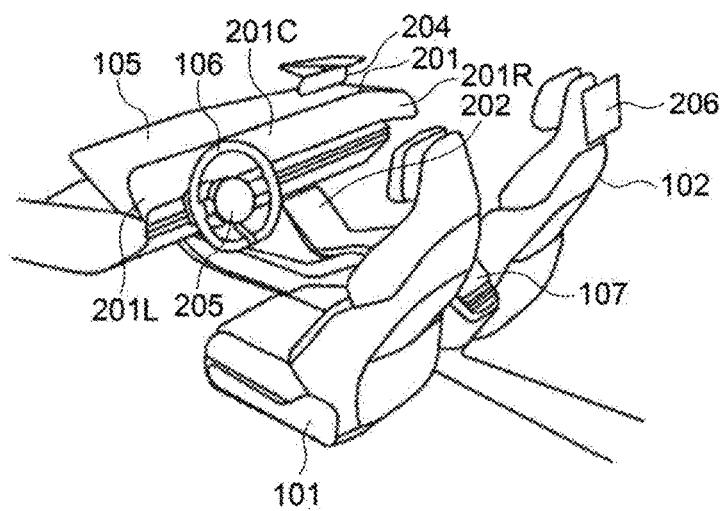
FIG. 31 is a diagram illustrating the interior of the vehicle diagonally from the rear to the front of the vehicle.

The display device 20 according to the present disclosure can be used for various applications. FIGS. 30 and 31 are diagrams illustrating the internal configuration of a vehicle 100, which serves as a first application example of an electronic device provided with the display device 20 according to the present disclosure. FIG. 30 is a diagram illustrating the interior of the vehicle 100 from the rear to the front of the vehicle 100, and FIG. 31 is a diagram illustrating the interior of the vehicle 100 diagonally from the rear to the front of the vehicle 100.

The vehicle 100 in FIGS. 30 and 31 includes a center display 101, a console display 102, a heads-up display 103, a digital rearview mirror 104, a steering wheel display 105, and a rear entertainment display 106.

The center display 101 is disposed on a dashboard 107 so as to face a driver's seat 108 and a passenger seat 109. Although FIG. 38 illustrates an example in which the center display 101 is in a landscape orientation, extending from the driver's seat 108 to the passenger seat 109, the center display 101 may have any screen size and may be provided at any location. The center display 101 can display information detected by various sensors 500. As specific examples, the center display 101 can display an image captured by an image sensor, a distance image measured by a ToF sensor 500 and indicating distances to obstructions in front of and to the sides of the vehicle, the body temperature of a passenger detected by an infrared sensor 500, and the like. The center display 101 can be used to display, for example, at least one of safety-related information, operation-related information, a lifelog, health-related information, authentication/identification-related information, and entertainment-related information.

The safety-related information is information obtained by detecting when a driver is falling asleep or not looking at the road, detecting when a child in the car is making mischief, detecting whether seatbelts are being worn, detecting whether an occupant has been left behind, and the like, and is information detected by a sensor 500 overlaid on a rear side of the center display 101, for example. The operation-related information is obtained by detecting gestures pertaining to operations made by an occupant using a sensor 500. The detected gestures may include operations of various equipment in the vehicle 100. For example, operations of air-conditioning equipment, a navigation system, an AV system, and a lighting system are detected. The lifelog includes lifelogs of all occupants. For example, the lifelogs include records of the actions of each occupant in the vehicle. Obtaining and storing the lifelogs makes it possible to confirm the states of occupants in the event of an accident. The health-related information is obtained by detecting the body temperature of an occupant using a temperature sensor 500, and estimating the state of health of the occupant based on the detected body temperature. Alternatively, an image of the occupant's face may be captured using an image sensor, and the state of health of the occupant may then be estimated on the basis of the occupant's facial expression in the image. Furthermore, automatic speech conversations may be performed with the occupant and the state of health of the occupant may then be estimated on the basis of the content of the occupant's responses. The authentication/identification-related information includes a keyless entry function for performing facial authentication using a sensor 500, a function for automatically adjusting the seat height and position through facial recognition, and the like. The entertainment-related information includes a function for detecting information on the operation of an AV system by an occupant using a sensor 500, a function for recognizing the face of an occupant using a sensor 500 and providing content tailored to the occupant through the AV system, and the like.

The console display 102 can be used to display lifelog information, for example. The console display 102 is disposed near a shift lever 111 of a center console 110 located between the driver's seat 108 and the passenger seat 109. Information detected by the various sensors 500 can also be displayed in the console display 102. The console display 102 may furthermore display an image of the surroundings of the vehicle, captured by an image sensor, or a distance image indicating a distance to an obstacle near the vehicle.

The heads-up display 103 is displayed in a virtual manner so as to appear in front of the driver's seat 108 and beyond a windshield 112. The heads-up display 103 can be used to display, for example, at least one of safety-related information, operation-related information, a lifelog, health-related information, authentication/identification-related information, and entertainment-related information. The heads-up display 103 is virtually displayed so as to appear in front of the driver's seat 108 and is therefore suitable for displaying information directly related to the operations of the vehicle 100, such as the speed or the remaining fuel (or battery) level of the vehicle 100.

The digital rearview mirror 104 can display not only the area to the rear of the vehicle 100, but also the state of occupants in the rear seats, and thus disposing a sensor 500 on the rear side of the digital rearview mirror 104 makes it possible to use the digital rearview mirror 104 to display lifelog information, for example.

The steering wheel display 105 is disposed near the center of a steering wheel 113 of the vehicle 100. The steering wheel display 105 can be used to display, for example, at least one of safety-related information, operation-related information, a lifelog, health-related information, authentication/identification-related information, and entertainment-related information. In particular, the steering wheel display 105 is disposed near the hands of the driver and is therefore suitable for displaying lifelog information such as the driver's body temperature, information about the operations of the AV system or air-conditioning equipment, and the like.

The rear entertainment display 106 is attached to the rear side of the driver's seat 108 or the passenger seat 109, and allows an occupant in the rear seat to view information. The rear entertainment display 106 can be used to display, for example, at least one of safety-related information, operation-related information, a lifelog, health-related information, authentication/identification-related information, and entertainment-related information. In particular, the rear entertainment display 106 is disposed directly in front of the occupant in the rear seat and thus displays information related to the occupant in the rear seat. For example, the rear entertainment display 106 may display information about the operations of the AV system or air-conditioning equipment, or the result of measuring the body temperature or the like of an occupant in the rear seat using a temperature sensor 500.

Disposing the sensor 500 on the rear side of the display device 20 makes it possible to measure the distance to an object near the vehicle. Optical rangefinding methods are broadly classified into passive types and active types. A passive type measures a distance by receiving light from an object without projecting light onto the object from a sensor 500. Lens focal methods, stereo methods, and monocular methods are examples of passive types. An active type measures a distance by projecting light onto an object and receiving light reflected by the object using a sensor 500. Optical radar methods, active stereo methods, photometric stereo methods, moiré topography methods, and interferometric methods are examples of active types. The display device 20 according to the present disclosure can be applied in any of these rangefinding methods. Using the sensor 500 overlaid on the rear side of the display device 20 according to the present disclosure makes the above-described passive-type or active-type rangefinding possible.

The present technique can also take on the following configurations.

(1) A display device including:
  a pixel section including a plurality of first pixels and a plurality of second pixels; and
  a driving unit that drives the pixel section,
  wherein the plurality of first pixels are provided corresponding to respective intersections between a plurality of first scanning lines and a plurality of first data lines,
  the plurality of second pixels are provided corresponding to respective intersections between a plurality of second scanning lines and a plurality of second data lines, and
  n of the plurality of second pixels (where n is any integer) are provided in a region where m of the plurality of first pixels (where m is any integer) are provided.

(2) The display device according to (1), further including:
  a plurality of light-emitting elements provided corresponding to respective ones of the plurality of first pixels,
  wherein each of m of the light-emitting elements provided corresponding to the m first pixels emits light according to a driving current supplied from the corresponding ones of the m first pixels, and emits light according to a driving current supplied from at least one of the n second pixels.

(3) The display device according to (1),
wherein a light-emitting element for the first pixel and a light-emitting element for a second pixel are provided separately, and
the display device further includes:
a plurality of first light-emitting elements provided corresponding to the plurality of first pixels; and
a plurality of second light-emitting elements provided corresponding to the plurality of second pixels.

(4) The display device according to (1),
wherein n is no greater than m.

(5) The display device according to (1), wherein the driving unit includes:
a first vertical driving circuit that supplies, to at least the plurality of first scanning lines, a scanning signal that selects one of the plurality of first pixels;
a first horizontal driving circuit that supplies, to at least the plurality of first data lines, a first data signal pertaining to a tone of first image data;
a second vertical driving circuit that supplies, to at least the plurality of second scanning lines, a scanning signal that selects one of the plurality of second pixels; and
a second horizontal driving circuit that supplies, to at least the plurality of second data lines, a second data signal pertaining to a tone of second image data.

(6) The display device according to (5),
wherein the first vertical driving circuit and the first horizontal driving circuit are capable of driving based on a first synchronization signal, and the second vertical driving circuit and the second horizontal driving circuit are capable of driving based on a second synchronization signal.

(7) The display device according to (6),
wherein the first synchronization signal and the second synchronization signal have different framerates.

(8) The display device according to (2) or (3),
wherein the light-emitting elements controlled to emit light by the first pixels and the light-emitting elements controlled to emit light by the second pixels have different light emission periods.

(9) The display device according to (2) or (3),
wherein the plurality of light-emitting elements are controlled to emit light by respective ones of the plurality of first pixels, and
the plurality of second pixels are capable of simultaneously controlling light emission of at least two light-emitting elements among the plurality of light-emitting elements.

(10) The display device according to (9),
wherein a rectifying device is connected between the at least two light-emitting elements and the first pixel.

(11) The display device according to (8),
wherein color filters corresponding to the plurality of light-emitting elements have a honeycomb structure.

(12) The display device according to (5),
wherein the first pixel includes at least a driving transistor that applies a current based on the first data signal to one end of the corresponding light-emitting element, and
the second pixel includes at least a driving transistor that applies a current based on the second data signal to one end of the corresponding light-emitting element.

(13) The display device according to (12),
wherein the first pixel includes at least a first transistor that sets one end of the corresponding light-emitting element to a predetermined potential and a second transistor that controls a power supply to the driving transistor, and
the second pixel includes at least a first transistor that sets one end of the corresponding light-emitting element to a predetermined potential and a second transistor that controls a power supply to the driving transistor.

(14) The display device according to (12),
wherein the first pixel includes at least a first transistor that sets one end of the corresponding light-emitting element to a ground potential and a second transistor that controls a power supply to the driving transistor, and
the second pixel shares at least the first transistor of the first pixel and the second transistor of the first pixel.

(15) The display device according to (14), further including:
a third vertical driving circuit that controls at least the first transistor of the first pixel and the second transistor of the first pixel.

(16) The display device according to (12),
wherein the first image data corresponds to an image of a central field of view of a captured image, and the second image data corresponds to a peripheral field of view of the captured image.

(17) An electronic device including the display device according to (1).

(18) A display control method for n of a plurality of second pixels (where n is any integer) provided in a region where m of a plurality of first pixels (where m is any integer) are provided, the display control method including:
the plurality of first pixels being driven by a driving unit according to first image data, the plurality of first pixels being provided corresponding to respective intersections between a plurality of first scanning lines and a plurality of first data lines;
the plurality of second pixels being driven by the driving unit according to second image data, the plurality of second pixels being provided corresponding to respective intersections between a plurality of second scanning lines and a plurality of second data lines; and
a plurality of light-emitting elements corresponding to the plurality of first pixels and the plurality of second pixels being controlled to emit light by at least one of the first pixels and the second pixels.

Aspects of the present disclosure are not limited to the aforementioned individual embodiments and include various modifications that those skilled in the art can achieve, and the effects of the present disclosure are also not limited to the details described above. In other words, various additions, modifications, and partial deletions can be made without departing from the conceptual idea and spirit of the present disclosure that can be derived from the details defined in the claims and the equivalents thereof.

REFERENCE SIGNS LIST

20 Display device
20H First image
20L Second image
30 Display control device
200 Display panel
200a First pixel
200b Second pixel
202a, 202b, 202c Vertical driving circuit
204a, 204b Horizontal driving circuit AZ, AZtr, AZ1 First transistor
DS transistor Second transistor
DRTr Driving transistor

The invention claimed is:

1. A display device comprising:
a pixel array including a plurality of first pixels and a plurality of second pixels; and
a driving circuit configured to drive the pixel array; and
a plurality of first light-emitting elements corresponding to respective ones of the plurality of first pixels, wherein
the plurality of first pixels correspond to respective intersections between a plurality of first scanning lines and a plurality of first data lines,
the plurality of second pixels correspond to respective intersections between a plurality of second scanning lines and a plurality of second data lines,
n of the plurality of second pixels (where n is any integer) are provided in a region where m of the plurality of first pixels (where m is any integer) are provided, and
each of m of the first light-emitting elements corresponding to the m first pixels emits light according to a driving current supplied from corresponding ones of the m first pixels, and emits light according to a driving current supplied from at least one of the n second pixels.

2. The display device according to claim 1, further comprising:
a plurality of second light-emitting elements corresponding to the plurality of second pixels.

3. The display device according to claim 1, wherein n is no greater than m.

4. The display device according to claim 1, wherein the driving circuit includes:
a first vertical driving circuit that supplies, to at least the plurality of first scanning lines, a scanning signal that selects one of the plurality of first pixels;
a first horizontal driving circuit that supplies, to at least the plurality of first data lines, a first data signal pertaining to a tone of first image data;
a second vertical driving circuit that supplies, to at least the plurality of second scanning lines, a scanning signal that selects one of the plurality of second pixels; and
a second horizontal driving circuit that supplies, to at least the plurality of second data lines, a second data signal pertaining to a tone of second image data.

5. The display device according to claim 4, wherein the first vertical driving circuit and the first horizontal driving circuit are configured for driving based on a first synchronization signal, and the second vertical driving circuit and the second horizontal driving circuit are configured for driving based on a second synchronization signal.

6. The display device according to claim 5, wherein the first synchronization signal and the second synchronization signal have different framerates.

7. The display device according to claim 1, wherein the plurality of first light-emitting elements and a plurality of second light-emitting elements corresponding to respective ones of the plurality of second pixels have different light emission periods.

8. The display device according to claim 1, wherein
the plurality of first light-emitting elements are controlled to emit light by respective ones of the plurality of first pixels, and
the plurality of second pixels are configured to simultaneously control light emission of a plurality of second light-emitting elements.

9. The display device according to claim 8, wherein a rectifying device is connected between at least two of the plurality of second light-emitting elements and at least one of the first pixels.

10. The display device according to claim 7, wherein color filters corresponding to the plurality of first light-emitting elements have a honeycomb structure.

11. The display device according to claim 4, wherein
the one of the plurality of first pixels includes a first driving transistor that applies a current based on the first data signal to a first end of a corresponding first light-emitting element, and
the one of the plurality of second pixels includes a second driving transistor that applies a current based on the second data signal to a first end of a corresponding second light-emitting element.

12. The display device according to claim 11, wherein
the one of the plurality of first pixels includes a first transistor that sets the first end of the corresponding first light-emitting element to a predetermined potential and a second transistor that controls a power supply to the first driving transistor, and
the one of the plurality of second pixels includes a third transistor that sets the first end of the corresponding second light-emitting element to a predetermined potential and a fourth transistor that controls a power supply to the second driving transistor.

13. A display device comprising:
a pixel array including a plurality of first pixels and a plurality of second pixels; and
a driving circuit configured to drive the pixel array, wherein
the plurality of first pixels correspond to respective intersections between a plurality of first scanning lines and a plurality of first data lines,
the plurality of second pixels correspond to respective intersections between a plurality of second scanning lines and a plurality of second data lines, and
n of the plurality of second pixels (where n is any integer) are provided in a region where m of the plurality of first pixels (where m is any integer) are provided;
wherein the driving circuit includes:
a first vertical driving circuit that supplies, to at least the plurality of first scanning lines, a scanning signal that selects one of the plurality of first pixels;
a first horizontal driving circuit that supplies, to at least the plurality of first data lines, a first data signal pertaining to a tone of first image data;
a second vertical driving circuit that supplies, to at least the plurality of second scanning lines, a scanning signal that selects one of the plurality of second pixels; and
a second horizontal driving circuit that supplies, to at least the plurality of second data lines, a second data signal pertaining to a tone of second image data, wherein
the one of the plurality of first pixels includes a first driving transistor that applies a current based on the first data signal to a first end of a corresponding first light-emitting element, and the one of the plurality of second pixels includes a second driving transistor that applies a current based on the second data signal to a first end of a corresponding second light-emitting element,
the one of the plurality of first pixels includes a first transistor that sets the first end of the corresponding first light-emitting element to a ground potential and a second transistor that controls a power supply to the first driving transistor, and the one of the plurality of second pixels shares at least one of the first transistor or the second transistor.

14. The display device according to claim 13, further comprising:
a third vertical driving circuit that controls the first transistor and the second transistor.

15. The display device according to claim 4, wherein the first image data corresponds to an image of a central field of view of a captured image, and the second image data corresponds to a peripheral field of view of the captured image.

16. An electronic device comprising the display device according to claim 1.

17. The electronic device according to claim 16, further comprising:
a plurality of second light-emitting elements corresponding to the plurality of second pixels.

18. The electronic device according to claim 16, wherein n is no greater than m.

19. The electronic device according to claim 16, wherein the driving circuit includes:
a first vertical driving circuit that supplies, to at least the plurality of first scanning lines, a scanning signal that selects one of the plurality of first pixels;
a first horizontal driving circuit that supplies, to at least the plurality of first data lines, a first data signal pertaining to a tone of first image data;
a second vertical driving circuit that supplies, to at least the plurality of second scanning lines, a scanning signal that selects one of the plurality of second pixels; and
a second horizontal driving circuit that supplies, to at least the plurality of second data lines, a second data signal pertaining to a tone of second image data.

20. The electronic device according to claim 19, wherein the first vertical driving circuit and the first horizontal driving circuit are configured for driving based on a first synchronization signal, and the second vertical driving circuit and the second horizontal driving circuit are configured for driving based on a second synchronization signal.

* * * * *